(12) United States Patent
Nagarajan

(10) Patent No.: US 12,340,090 B2
(45) Date of Patent: Jun. 24, 2025

(54) POLYHEDRON MODELS AND METHODS USING COMPUTATIONAL OPERATIONS FOR DISTRIBUTING DATA

(71) Applicant: Microchip Technology Incorporated, Chandler, AZ (US)

(72) Inventor: Anand Nagarajan, Karnataka (IN)

(73) Assignee: Microchip Technology Incorporated, Chandler, AZ (US)

(*) Notice: Subject to any disclaimer, the term of this patent is extended or adjusted under 35 U.S.C. 154(b) by 0 days.

(21) Appl. No.: 18/394,226

(22) Filed: Dec. 22, 2023

(65) Prior Publication Data
US 2025/0068331 A1   Feb. 27, 2025

(30) Foreign Application Priority Data

Aug. 21, 2023   (IN) .............................. 202311056017

(51) Int. Cl.
*G06F 3/06*   (2006.01)
*G06F 11/10*  (2006.01)

(52) U.S. Cl.
CPC .......... *G06F 3/0616* (2013.01); *G06F 3/0659* (2013.01); *G06F 3/0689* (2013.01); *G06F 11/1096* (2013.01)

(58) Field of Classification Search
CPC .... G06F 3/0616; G06F 3/0659; G06F 3/0689; G06F 11/1096
See application file for complete search history.

(56) References Cited

U.S. PATENT DOCUMENTS

| | | | |
|---|---|---|---|
| 8,977,942 B2* | 3/2015 | Wu .................. | H03M 13/2927 714/755 |
| 11,243,697 B1* | 2/2022 | Viraraghavan ....... | G06F 3/0653 |
| 2004/0250161 A1 | 12/2004 | Patterson ..................... | 714/6.22 |
| 2016/0026527 A1* | 1/2016 | Marov ................ | H03M 13/154 714/764 |
| 2023/0072348 A1* | 3/2023 | Luo ........................ | G06F 11/108 |

OTHER PUBLICATIONS

Akhmetgalym, Tlek, et al. "Improving the Security of Split Data When Using Multidimensional Parity Algorithms." International Journal of Interactive Mobile Technologies 16.21 (2022). (Year: 2022).*
International Search Report and Written Opinion, Application No. PCT/US2024/016605, 10 pages, Jul. 5, 2024.

* cited by examiner

*Primary Examiner* — Kalpit Parikh
(74) *Attorney, Agent, or Firm* — SLAYDEN GRUBERT BEARD,PLLC

(57) ABSTRACT

Methods based on polyhedron models using computational operations for distributing data and parities among different data storage media. Devices, systems, and methods that split data into data strips, wherein the number of data strips equals the number of vertices of a polyhedron and respective ones of the number of the data strips correspond to respective ones of the number of vertices of the polyhedron; construct a number of parities, wherein the number of parities equals the number of faces of the polyhedron and respective ones of the number of parities correspond to respective ones of the number of parities of the polyhedron, wherein respective ones of the number of parities are constructed by computationally operating the data strips corresponding to vertices respectively associated with a face of the polyhedron corresponding to the respective parity; and distribute subsets of data strips and subsets of parities to subsets of storage media.

23 Claims, 35 Drawing Sheets

| NAME | VALUE |
|---|---|
| PARITY 1 | DATA 1 ⊕ DATA 2 ⊕ DATA 3 |
| PARITY 2 | DATA 2 ⊕ DATA 3 ⊕ DATA 4 |
| PARITY 3 | DATA 3 ⊕ DATA 4 ⊕ DATA 1 |
| PARITY 4 | DATA 4 ⊕ DATA 1 ⊕ DATA 2 |

| | PARITY | FIRST DATA STRIP ID | SECOND DATA STRIP ID | THIRD DATA STRIP ID |
|---|---|---|---|---|
| TETRAHEDRON DATA STRIPE NUMBER ONE | 1 | 1 | 2 | 3 |
| | 2 | 2 | 3 | 4 |
| | 3 | 3 | 4 | 1 |
| | 4 | 4 | 1 | 2 |
| TETRAHEDRON DATA STRIPE NUMBER TWO | 5 | 5 | 6 | 7 |
| | 6 | 6 | 7 | 8 |
| | 7 | 7 | 8 | 5 |
| | 8 | 8 | 5 | 6 |
| TETRAHEDRON DATA STRIPE NUMBER THREE | 9 | 9 | 10 | 11 |
| | 10 | 10 | 11 | 12 |
| | 11 | 11 | 12 | 9 |
| | 12 | 12 | 9 | 10 |
| TETRAHEDRON DATA STRIPE NUMBER FOUR | 13 | 13 | 14 | 15 |
| | 14 | 14 | 15 | 16 |
| | 15 | 15 | 16 | 13 |
| | 16 | 16 | 13 | 14 |
| TETRAHEDRON DATA STRIPE NUMBER FIVE | 17 | 17 | 18 | 19 |
| | 18 | 18 | 19 | 20 |
| | 19 | 19 | 20 | 17 |
| | 20 | 20 | 17 | 18 |
| TETRAHEDRON DATA STRIPE NUMBER SIX | 21 | 21 | 22 | 23 |
| | 22 | 22 | 23 | 24 |
| | 23 | 23 | 24 | 21 |
| | 24 | 24 | 21 | 22 |
| TETRAHEDRON DATA STRIPE NUMBER SEVEN | 25 | 25 | 26 | 27 |
| | 26 | 26 | 27 | 28 |
| | 27 | 27 | 28 | 25 |
| | 28 | 28 | 25 | 26 |
| TETRAHEDRON DATA STRIPE NUMBER EIGHT | 29 | 29 | 30 | 31 |
| | 30 | 30 | 31 | 32 |
| | 31 | 31 | 32 | 29 |
| | 32 | 32 | 29 | 30 |

FIG. 3C

| DRIVE 1 | DRIVE 2 | DRIVE 3 | DRIVE 4 | DRIVE 5 | DRIVE 6 | DRIVE 7 | DRIVE 8 |
|---|---|---|---|---|---|---|---|
| DATA 1 | DATA 2 | DATA 3 | DATA 4 | PARITY 1 | PARITY 2 | PARITY 3 | PARITY 4 |
| PARITY 8 | DATA 5 | DATA 6 | DATA 7 | DATA 8 | PARITY 5 | PARITY 6 | PARITY 7 |
| PARITY 11 | PARITY 12 | DATA 9 | DATA 10 | DATA 11 | DATA 12 | PARITY 9 | PARITY 10 |
| PARITY 14 | PARITY 15 | PARITY 16 | DATA 13 | DATA 14 | DATA 15 | DATA 16 | PARITY 13 |
| PARITY 17 | PARITY 18 | PARITY 19 | PARITY 20 | DATA 17 | DATA 18 | DATA 19 | DATA 20 |
| DATA 24 | PARITY 21 | PARITY 22 | PARITY 23 | PARITY 24 | DATA 21 | DATA 22 | DATA 23 |
| DATA 27 | DATA 28 | PARITY 25 | PARITY 26 | PARITY 27 | PARITY 28 | DATA 25 | DATA 26 |
| DATA 30 | DATA 31 | DATA 32 | PARITY 29 | PARITY 30 | PARITY 31 | PARITY 32 | DATA 29 |

FIG. 3D

| DRIVE 1* | DRIVE 2* | DRIVE 3* | DRIVE 4 | DRIVE 5 | DRIVE 6 | DRIVE 7 | DRIVE 8 |
|---|---|---|---|---|---|---|---|
| DATA 1 | DATA 2 | DATA 3 | DATA 4 | PARITY 1 | PARITY 2 | PARITY 3 | PARITY 4 |
| PARITY 8 | DATA 5 | DATA 6 | DATA 7 | DATA 8 | PARITY 5 | PARITY 6 | PARITY 7 |
| PARITY 11 | PARITY 12 | DATA 9 | DATA 10 | DATA 11 | DATA 12 | PARITY 9 | PARITY 10 |
| PARITY 14 | PARITY 15 | PARITY 16 | DATA 13 | DATA 14 | DATA 15 | DATA 16 | PARITY 13 |
| PARITY 17 | PARITY 18 | PARITY 19 | PARITY 20 | DATA 17 | DATA 18 | DATA 19 | DATA 20 |
| DATA 24 | PARITY 21 | PARITY 22 | PARITY 23 | PARITY 24 | DATA 21 | DATA 22 | DATA 23 |
| DATA 27 | DATA 28 | PARITY 25 | PARITY 26 | PARITY 27 | PARITY 28 | DATA 25 | DATA 26 |
| DATA 30 | DATA 31 | DATA 32 | PARITY 29 | PARITY 30 | PARITY 31 | PARITY 32 | DATA 29 |

FIG. 3E

| DRIVE 1* | RECONSTRUCTED DATA |
|---|---|
| DATA 1' | PARITY 1 ⊕ PARITY 3 ⊕ PARITY 4 |
| PARITY 8' | PARITY 7 ⊕ DATA 7 ⊕ DATA 8 |
| PARITY 11' | PARITY 9 ⊕ PARITY 10 ⊕ DATA 11 |
| PARITY 14' | DATA 14 ⊕ DATA 15 ⊕ DATA 16 |
| PARITY 17' | DATA 17 ⊕ DATA 18 ⊕ DATA 19 |
| DATA 24' | PARITY 24 ⊕ DATA 21 ⊕ DATA 22 |
| DATA 27' | PARITY 27 ⊕ PARITY 28 ⊕ DATA 26 |
| DATA 30' | PARITY 30 ⊕ PARITY 31 ⊕ DATA 29 |

| DRIVE 2* | RECONSTRUCTED DATA |
|---|---|
| DATA 2' | PARITY 1 ⊕ PARITY 2 ⊕ PARITY 4 |
| DATA 5' | PARITY 5 ⊕ PARITY 6 ⊕ DATA 8 |
| PARITY 12' | PARITY 9 ⊕ DATA 11 ⊕ DATA 12 |
| PARITY 15' | DATA 15 ⊕ DATA 16 ⊕ DATA 13 |
| PARITY 18' | DATA 18 ⊕ DATA 19 ⊕ DATA 20 |
| PARITY 21' | DATA 21 ⊕ DATA 22 ⊕ DATA 23 |
| DATA 28' | PARITY 28 ⊕ DATA 25 ⊕ DATA 26 |
| DATA 31' | PARITY 30 ⊕ PARITY 32 ⊕ DATA 29 |

| DRIVE 3* | RECONSTRUCTED DATA |
|---|---|
| DATA 3' | PARITY 1 ⊕ PARITY 2 ⊕ PARITY 3 |
| DATA 6' | PARITY 6 ⊕ PARITY 7 ⊕ DATA 8 |
| DATA 9' | PARITY 9 ⊕ DATA 10 ⊕ DATA 11 |
| PARITY 16' | DATA 16 ⊕ DATA 13 ⊕ DATA 14 |
| PARITY 19' | DATA 19 ⊕ DATA 20 ⊕ DATA 17 |
| PARITY 22' | PARITY 23 ⊕ DATA 21 ⊕ DATA 22 |
| PARITY 25' | PARITY 27 ⊕ PARITY 28 ⊕ DATA 25 |
| DATA 32' | PARITY 30 ⊕ PARITY 31 ⊕ PARITY 32 |

FIG. 3F

| NAME | VALUE |
|---|---|
| PARITY 1 | DATA 1 ⊕ DATA 2 ⊕ DATA 3 ⊕ DATA 4 |
| PARITY 2 | DATA 2 ⊕ DATA 6 ⊕ DATA 7 ⊕ DATA 3 |
| PARITY 3 | DATA 3 ⊕ DATA 4 ⊕ DATA 8 ⊕ DATA 7 |
| PARITY 4 | DATA 5 ⊕ DATA 6 ⊕ DATA 2 ⊕ DATA 1 |
| PARITY 5 | DATA 5 ⊕ DATA 6 ⊕ DATA 7 ⊕ DATA 8 |
| PARITY 6 | DATA 4 ⊕ DATA 1 ⊕ DATA 5 ⊕ DATA 8 |

| PARITY | FIRST DATA STRIP ID | SECOND DATA STRIP ID | THIRD DATA STRIP ID | FOURTH DATA STRIP ID | |
|---|---|---|---|---|---|
| 1 | 1 | 2 | 3 | 4 | CUBE DATA STRIPE NUMBER 1 |
| 2 | 2 | 6 | 7 | 3 | |
| 3 | 3 | 4 | 8 | 7 | |
| 4 | 5 | 6 | 2 | 1 | |
| 5 | 5 | 6 | 7 | 8 | |
| 6 | 4 | 1 | 5 | 8 | |
| 7 | 9 | 10 | 11 | 12 | CUBE DATA STRIPE NUMBER 2 |
| 8 | 10 | 14 | 15 | 11 | |
| 9 | 11 | 12 | 16 | 15 | |
| 10 | 13 | 14 | 10 | 9 | |
| 11 | 13 | 14 | 15 | 16 | |
| 12 | 12 | 9 | 13 | 16 | |
| 13 | 17 | 18 | 19 | 20 | CUBE DATA STRIPE NUMBER 3 |
| 14 | 18 | 22 | 23 | 19 | |
| 15 | 19 | 20 | 24 | 23 | |
| 16 | 21 | 22 | 18 | 17 | |
| 17 | 21 | 22 | 23 | 24 | |
| 18 | 20 | 17 | 21 | 24 | |
| 19 | 25 | 26 | 27 | 28 | CUBE DATA STRIPE NUMBER 4 |
| 20 | 26 | 30 | 31 | 27 | |
| 21 | 27 | 28 | 32 | 31 | |
| 22 | 29 | 30 | 26 | 25 | |
| 23 | 29 | 30 | 31 | 32 | |
| 24 | 28 | 25 | 29 | 32 | |

FIG. 4C

| DRIVE 1 | DRIVE 2 | DRIVE 3 | DRIVE 4 | DRIVE 5 | DRIVE 6 | DRIVE 7 |
|---|---|---|---|---|---|---|
| DATA 1 | DATA 2 | DATA 3 | DATA 4 | DATA 5 | DATA 6 | DATA 7 |
| PARITY 12 | DATA 9 | DATA 10 | DATA 11 | DATA 12 | DATA 13 | DATA 14 |
| PARITY 17 | PARITY 18 | DATA 17 | DATA 18 | DATA 19 | DATA 20 | DATA 21 |
| PARITY 22 | PARITY 23 | PARITY 24 | DATA 25 | DATA 26 | DATA 27 | DATA 28 |

| DRIVE 8 | DRIVE 9 | DRIVE 10 | DRIVE 11 | DRIVE 12 | DRIVE 13 | DRIVE 14 |
|---|---|---|---|---|---|---|
| DATA 8 | PARITY 1 | PARITY 2 | PARITY 3 | PARITY 4 | PARITY 5 | PARITY 6 |
| DATA 15 | DATA 16 | PARITY 7 | PARITY 8 | PARITY 9 | PARITY 10 | PARITY 11 |
| DATA 22 | DATA 23 | DATA 24 | PARITY 13 | PARITY 14 | PARITY 15 | PARITY 16 |
| DATA 29 | DATA 30 | DATA 31 | DATA 32 | PARITY 19 | PARITY 20 | PARITY 21 |

FIG. 4D

| DRIVE 1* | DRIVE 2 | DRIVE 3 | DRIVE 4 | DRIVE 5* | DRIVE 6 | DRIVE 7 |
|---|---|---|---|---|---|---|
| DATA 1 | DATA 2 | DATA 3 | DATA 4 | DATA 5 | DATA 6 | DATA 7 |
| PARITY 12 | DATA 9 | DATA 10 | DATA 11 | DATA 12 | DATA 13 | DATA 14 |
| PARITY 17 | PARITY 18 | DATA 17 | DATA 18 | DATA 19 | DATA 20 | DATA 21 |
| PARITY 22 | PARITY 23 | PARITY 24 | DATA 25 | DATA 26 | DATA 27 | DATA 28 |

| DRIVE 8 | DRIVE 9* | DRIVE 10 | DRIVE 11 | DRIVE 12 | DRIVE 13 | DRIVE 14 |
|---|---|---|---|---|---|---|
| DATA 8 | PARITY 1 | PARITY 2 | PARITY 3 | PARITY 4 | PARITY 5 | PARITY 6 |
| DATA 15 | DATA 16 | PARITY 7 | PARITY 8 | PARITY 9 | PARITY 10 | PARITY 11 |
| DATA 22 | DATA 23 | DATA 24 | PARITY 13 | PARITY 14 | PARITY 15 | PARITY 16 |
| DATA 29 | DATA 30 | DATA 31 | DATA 32 | PARITY 19 | PARITY 20 | PARITY 21 |

FIG. 4E

| DRIVE 1 | RECONSTRUCTED DATA |
|---|---|
| DATA 1" | PARITY 4 ⊕ DATA 6 ⊕ DATA 2 ⊕ DATA 5' |
| PARITY 12" | DATA 12' ⊕ DATA 9 ⊕ DATA 13 ⊕ DATA 16' |
| PARITY 17''' | DATA 21 ⊕ DATA 22 ⊕ DATA 23" ⊕ DATA 24 |
| PARITY 22" | DATA 29 ⊕ DATA 30' ⊕ DATA 26' ⊕ DATA 25 |

| DRIVE 5 | RECONSTRUCTED DATA |
|---|---|
| DATA 5' | PARITY 5 ⊕ DATA 6 ⊕ DATA 7 ⊕ DATA 8 |
| DATA 12' | PARITY 7 ⊕ DATA 9 ⊕ DATA 10 ⊕ DATA 11 |
| DATA 19' | PARITY 13 ⊕ DATA 17 ⊕ DATA 18 ⊕ DATA 20 |
| DATA 26' | PARITY 19 ⊕ DATA 25 ⊕ DATA 27 ⊕ DATA 28 |

| DRIVE 9 | RECONSTRUCTED DATA |
|---|---|
| PARITY 1'" | DATA 1' ⊕ DATA 2 ⊕ DATA 3 ⊕ DATA 4 |
| DATA 16' | PARITY 11 ⊕ DATA 13 ⊕ DATA 14 ⊕ DATA 15 |
| DATA 23" | PARITY 14 ⊕ DATA 18 ⊕ DATA 22 ⊕ DATA 19' |
| DATA 30' | PARITY 23 ⊕ DATA 29 ⊕ DATA 31 ⊕ DATA 32 |

FIG. 4F

| NAME | VALUE |
|---|---|
| PARITY 1 | DATA 1 ⊕ DATA 2 ⊕ DATA 3 ⊕ DATA 4 ⊕ DATA 5 |
| PARITY 2 | DATA 1 ⊕ DATA 6 ⊕ DATA 7 ⊕ DATA 8 ⊕ DATA 2 |
| PARITY 3 | DATA 2 ⊕ DATA 8 ⊕ DATA 9 ⊕ DATA 10 ⊕ DATA 3 |
| PARITY 4 | DATA 3 ⊕ DATA 10 ⊕ DATA 11 ⊕ DATA 12 ⊕ DATA 4 |
| PARITY 5 | DATA 4 ⊕ DATA 12 ⊕ DATA 13 ⊕ DATA 14 ⊕ DATA 5 |
| PARITY 6 | DATA 5 ⊕ DATA 14 ⊕ DATA 15 ⊕ DATA 6 ⊕ DATA 1 |
| PARITY 7 | DATA 6 ⊕ DATA 7 ⊕ DATA 16 ⊕ DATA 20 ⊕ DATA 15 |
| PARITY 8 | DATA 7 ⊕ DATA 8 ⊕ DATA 9 ⊕ DATA 17 ⊕ DATA 16 |
| PARITY 9 | DATA 9 ⊕ DATA 10 ⊕ DATA 11 ⊕ DATA 18 ⊕ DATA 17 |
| PARITY 10 | DATA 11 ⊕ DATA 12 ⊕ DATA 13 ⊕ DATA 19 ⊕ DATA 18 |
| PARITY 11 | DATA 13 ⊕ DATA 14 ⊕ DATA 15 ⊕ DATA 20 ⊕ DATA 19 |
| PARITY 12 | DATA 16 ⊕ DATA 17 ⊕ DATA 18 ⊕ DATA 19 ⊕ DATA 20 |

FIG. 5B

| PARITY | FIRST DATA STRIP ID | SECOND DATA STRIP ID | THIRD DATA STRIP ID | FOURTH DATA STRIP ID | FIFTH DATA STRIP ID | |
|---|---|---|---|---|---|---|
| 1 | 1 | 2 | 3 | 4 | 5 | DODECAHEDRON DATA STRIPE NUMBER 1 |
| 2 | 1 | 6 | 7 | 8 | 2 | |
| 3 | 2 | 8 | 9 | 10 | 3 | |
| 4 | 3 | 10 | 11 | 12 | 4 | |
| 5 | 4 | 12 | 13 | 14 | 5 | |
| 6 | 5 | 14 | 15 | 6 | 1 | |
| 7 | 6 | 7 | 16 | 20 | 15 | |
| 8 | 7 | 8 | 9 | 17 | 16 | |
| 9 | 9 | 10 | 11 | 18 | 17 | |
| 10 | 11 | 12 | 13 | 19 | 18 | |
| 11 | 13 | 14 | 15 | 20 | 19 | |
| 12 | 16 | 17 | 18 | 19 | 20 | |
| 13 | 21 | 22 | 23 | 24 | 25 | DODECAHEDRON DATA STRIPE NUMBER 2 |
| 14 | 21 | 26 | 27 | 28 | 22 | |
| 15 | 22 | 28 | 29 | 30 | 23 | |
| 16 | 23 | 30 | 31 | 32 | 24 | |
| 17 | 24 | 32 | 33 | 34 | 25 | |
| 18 | 25 | 34 | 35 | 26 | 21 | |
| 19 | 26 | 27 | 36 | 40 | 35 | |
| 20 | 27 | 28 | 29 | 37 | 36 | |
| 21 | 29 | 30 | 31 | 38 | 37 | |
| 22 | 31 | 32 | 33 | 39 | 38 | |
| 23 | 33 | 34 | 35 | 40 | 39 | |
| 24 | 36 | 37 | 38 | 39 | 40 | |

FIG. 5C

| DR 1 | DR 2 | DR 3 | DR 4 | DR 5 | DR 6 | DR 7 | DR 8 | DR 9 | DR 10 | DR 11 | DR 12 | DR 13 | DR 14 | DR 15 | DR 16 |
|---|---|---|---|---|---|---|---|---|---|---|---|---|---|---|---|
| D1 | D2 | D3 | D4 | D5 | D6 | D7 | D8 | D9 | D10 | D11 | D12 | D13 | D14 | D15 | D16 |
| P24 | D21 | D22 | D23 | D24 | D25 | D26 | D27 | D28 | D29 | D30 | D31 | D32 | D33 | D34 | D35 |
| P35 | P36 | P41 | D42 | D43 | D44 | D45 | D46 | D47 | D48 | D49 | D50 | D51 | D52 | D53 | D54 |
| P46 | P47 | P48 | D61 | D62 | D63 | D64 | D65 | D66 | D67 | D68 | D69 | D70 | D71 | D72 | D73 |

| DR 17 | DR 18 | DR 19 | DR 20 | DR 21 | DR 22 | DR 23 | DR 24 | DR 25 | DR 26 | DR 27 | DR 28 | DR 29 | DR 30 | DR 31 | DR 32 |
|---|---|---|---|---|---|---|---|---|---|---|---|---|---|---|---|
| D17 | D18 | D19 | D20 | P1 | P2 | P3 | P4 | P5 | P6 | P7 | P8 | P9 | P10 | P11 | P12 |
| D36 | D37 | D38 | D39 | D40 | P13 | P14 | P15 | P16 | P17 | P18 | P19 | P20 | P21 | P22 | P23 |
| D55 | D56 | D57 | D58 | D59 | D60 | P25 | P26 | P27 | P28 | P29 | P30 | P31 | P32 | P33 | P34 |
| D74 | D75 | D76 | D77 | D78 | D79 | D80 | P37 | P38 | P39 | P40 | P41 | P42 | P43 | P44 | P45 |

| DR 1 | DR 2 | DR 3 | DR 4* | DR 5* | DR 6* | DR 7* | DR 8* | DR 9* | DR 10 | DR 11 | DR 12 | DR 13 | DR 14 | DR 15 | DR 16 |
|---|---|---|---|---|---|---|---|---|---|---|---|---|---|---|---|
| D1 | D2 | D3 | D4 | D5 | D6 | D7 | D8 | D9 | D10 | D11 | D12 | D13 | D14 | D15 | D16 |
| P24 | D21 | D22 | D23 | D24 | D25 | D26 | D27 | D28 | D29 | D30 | D31 | D32 | D33 | D34 | D35 |
| P35 | P36 | D41 | D42 | D43 | D44 | D45 | D46 | D47 | D48 | D49 | D50 | D51 | D52 | D53 | D54 |
| P46 | P47 | P48 | D61 | D62 | D63 | D64 | D65 | D66 | D67 | D68 | D69 | D70 | D71 | D72 | D73 |

| DR 17 | DR 18 | DR 19 | DR 20 | DR 21 | DR 22 | DR 23 | DR 24 | DR 25 | DR 26 | DR 27 | DR 28 | DR 29 | DR 30 | DR 31 | DR 32 |
|---|---|---|---|---|---|---|---|---|---|---|---|---|---|---|---|
| D17 | D18 | D19 | D20 | P1 | P2 | P3 | P4 | P5 | P6 | P7 | P8 | P9 | P10 | P11 | P12 |
| D36 | D37 | D38 | D39 | D40 | P13 | P14 | P15 | P16 | P17 | P18 | P19 | P20 | P21 | P22 | P23 |
| D55 | D56 | D57 | D58 | D59 | D60 | P25 | P26 | P27 | P28 | P29 | P30 | P31 | P32 | P33 | P34 |
| D74 | D75 | D76 | D77 | D78 | D79 | D80 | P37 | P38 | P39 | P40 | P41 | P42 | P43 | P44 | P45 |

| DR 4* | RECONSTRUCTED DATA |
|---|---|
| D 4' | P 4 ⊕ D 3 ⊕ D 10 ⊕ D 11 ⊕ D 12 |
| D 23''' | P 13 ⊕ D 21 ⊕ D 22 ⊕ D 24" ⊕ D 25' |
| D 42" | P 26 ⊕ D 41 ⊕ D 46' ⊕ D 47 ⊕ D 48 |
| D 61' | P 37 ⊕ (P 39 ⊕ D 68 ⊕ D 69 ⊕ D 70) ⊕ (P 41 ⊕ D 72 ⊕ D 73 ⊕ D 74) |

| DR 5* | RECONSTRUCTED DATA |
|---|---|
| D 5" | P 5 ⊕ D 4' ⊕ D 12 ⊕ D 13 ⊕ D 14 |
| D 24" | P 17 ⊕ D 32 ⊕ D 33 ⊕ D 34 ⊕ D 25' |
| D 43"" | P 28 ⊕ D 50 ⊕ D 51 ⊕ D 52 ⊕ D 44''' |
| D 62" | P 38 ⊕ D 61' ⊕ D 66 ⊕ D 67 ⊕ D 68 |

| DR 6* | RECONSTRUCTED DATA |
|---|---|
| D 6''' | P 6 ⊕ D 5" ⊕ D 14 ⊕ D 15 ⊕ D 1 |
| D 25' | (P 16 ⊕ D 30 ⊕ D 31 ⊕ D 32) ⊕ (P 13 ⊕ D 21 ⊕ D 22) |
| D 44''' | P 29 ⊕ D 52 ⊕ D 53 ⊕ D 54 ⊕ D 45" |
| D 63''' | P 39 ⊕ D 62" ⊕ D 68 ⊕ D 69 ⊕ D 70 |

| DR 7* | RECONSTRUCTED DATA |
|---|---|
| D 7" | P 8 ⊕ D 8' ⊕ D 9' ⊕ D 17 ⊕ D 16 |
| D 26" | P 19 ⊕ D 27' ⊕ D 36 ⊕ D 40 ⊕ D 35 |
| D 45" | P 30 ⊕ D 54 ⊕ D 55 ⊕ D 46' ⊕ D 41 |
| D 64''' | P 41 ⊕ D 72 ⊕ D 73 ⊕ D 74 ⊕ D 65" |

| DR 8* | RECONSTRUCTED DATA |
|---|---|
| D 8' | P 3 ⊕ D 2 ⊕ D 9 ⊕ D 10 ⊕ D 3 |
| D 27' | P 20 ⊕ D 28 ⊕ D 29 ⊕ D 37 ⊕ D 36 |
| D 46' | P 31 ⊕ D 47 ⊕ D 56 ⊕ D 60 ⊕ D 55 |
| D 65" | P 42 ⊕ D 74 ⊕ D 75 ⊕ D 66 ⊕ D 61' |

FIG. 5F

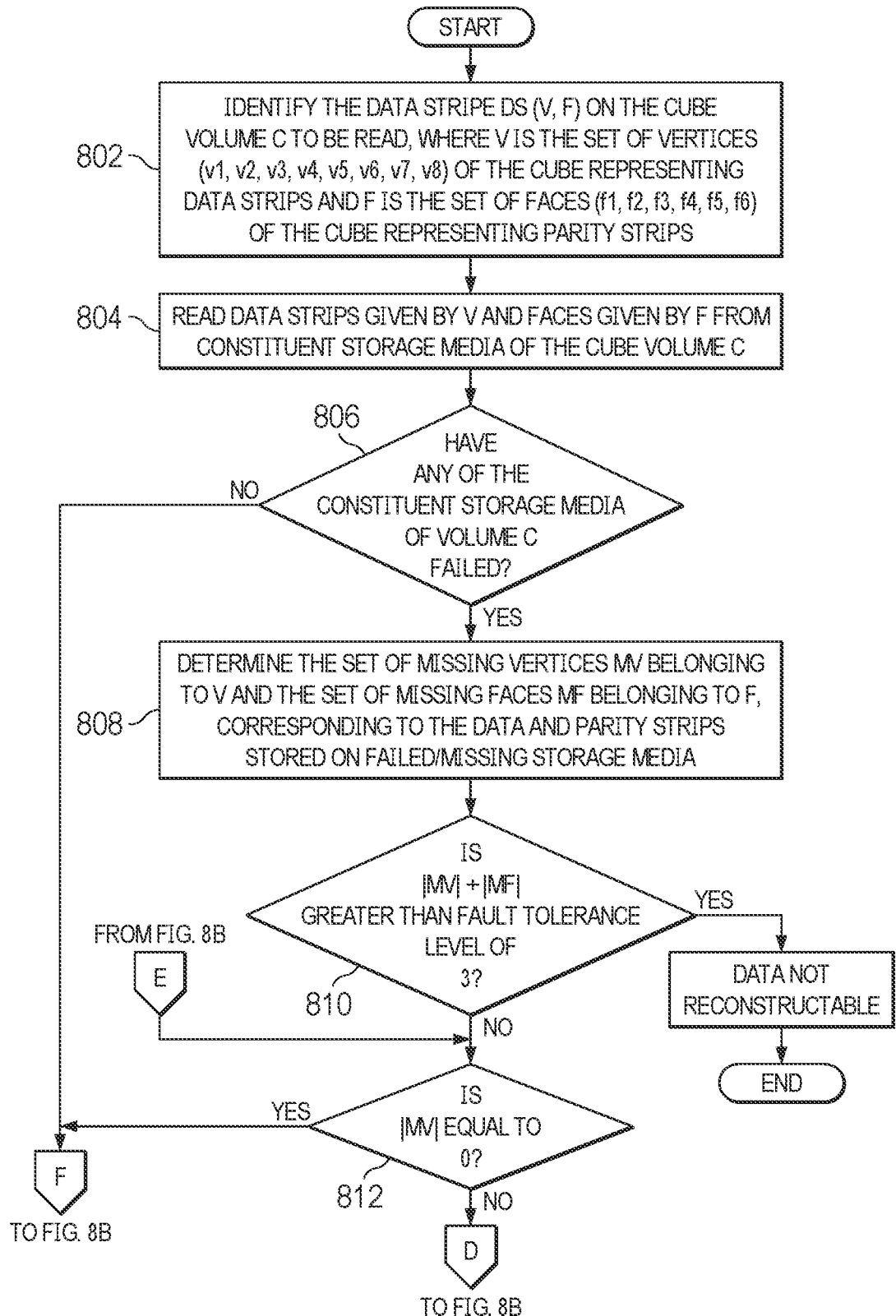

| PARAMETER | RAID 5 | RAID 6 | TETRAHEDRON | CUBE | DODECAHEDRON |
|---|---|---|---|---|---|
| TOTAL DISKS | 3-32 | 4-32 | 8 | 14 | 32 |
| DATA DISKS | 2-31 | 2-30 | 4 | 8 | 20 |
| MAXIMUM FAULT TOLERANCE | 1 | 2 | 3 | 3 | 5 |
| STORAGE OVERHEAD | 1.5x-1.03x | 2x-1.07x | 2x | 1.75x | 1.6x |
| PROBABILITY OF FAILURE | 4.11-43.84 | 2.74-21.92 | 3.65 | 7.31 | 8.77 |
| WRITE COMPUTATIONAL OVERHEAD PER DATA STRIPE | 1-30 XORs | 2-58 XORs | 8 XORs | 18 XORs | 48 XORs |
| NUMBER OF GALOIS FIELD MULTIPLICATIONS PER DATA STRIPE | 0 | 4-60 | 0 | 0 | 0 |

FIG. 10

| DRIVE TYPE | I/O TYPE | RAID 5x8 DRIVE | RAID 6x8 DRIVE | TETRAHEDRON x8 DRIVE | RAID 5x14 DRIVE | RAID 6x14 DRIVE | CUBE x14 DRIVE | CUBE 5x32 DRIVE | RAID 6x32 DRIVE | DODECAHEDRON x32 DRIVE |
|---|---|---|---|---|---|---|---|---|---|---|
| SAS SSD | READ | 6 | 6 | 6 | 6 | 6 | 6 | 6 | 6 | 6 |
| SAS SSD | WRITE | 3.5 | 3 | 3.5 | 3.4 | 3.1 | 3.3 | 3.4 | 3.1 | 3.4 |
| SATA SSD | READ | 8 | 7.8 | 8 | 13 | 13 | 13 | 13 | 13 | 13 |
| SATA SSD | WRITE | 6.7 | 5.8 | 6.7 | 7.8 | 7.1 | 7.7 | 7.8 | 7.1 | 7.7 |
| SAS HDD | READ | 8 | 7.9 | 8 | 13.8 | 13.8 | 13.8 | 25.4 | 25.4 | 25.4 |
| SAS HDD | WRITE | 7.2 | 6.5 | 7.2 | 12.5 | 11.4 | 12.2 | 13.1 | 11.9 | 12.4 |
| SATA HDD | READ | 8 | 8 | 8 | 14 | 14 | 14 | 32 | 32 | 32 |
| SATA HDD | WRITE | 7.2 | 7.2 | 7.2 | 12.6 | 11.5 | 12.1 | 25.4 | 23 | 23.9 |

FIG. 12

POLYHEDRON MODELS AND METHODS USING COMPUTATIONAL OPERATIONS FOR DISTRIBUTING DATA

CROSS-REFERENCE TO RELATED APPLICATIONS

This application claims priority to India Patent Application No. 202311056017, filed 21 Aug. 2023, which is hereby incorporated by reference in its entirety as if fully set forth herein.

TECHNICAL FIELD

The present disclosure relates to erasure coded data storage, in particular, storing data via a graph-based erasure code model for encoding and decoding data, and redundantly distributing data among different data storage media.

BACKGROUND

Erasure coding takes original data and encodes it, so that when the data is requested for retrieval, a subset of data may be used to recreate the original data information. Erasure coding is a data protection scheme that breaks data into fragments, expands and encodes the data fragments with redundancy, and stores the data fragments across multiple locations. Erasure coding may protect against losing data even if multiple disks fail.

Another method of protecting data is RAID (redundant array of independent disks), which saves data in multiple places so that if one or more disks fail, copies of the data is on other disks. There are RAID levels which provide a failure tolerance of up to two disks. Even nested RAID levels assure reconstructibility for up to two disks based on the failure tolerance of a leg corresponding to the primary RAID level. With disks becoming larger, and rebuild times taking longer, the two disk failure limit becomes a serious limitation of RAID implementations. RAID implementations offer high performance levels owing to degree of parallelism which can be obtained when multiple media are used to store data. However, the probability of failure of the overall volume also increases with an increase in the number of storage media (e.g., memory disks) if there is no corresponding increase in the number of parities added. Storage media include: hard disk drives, solid state disk drives, tape drives, and optical drives, without limitation.

A volume, a logical drive, a RAID volume, or an erasure coded volume is a logical abstraction of a set of physical disks. The logical volume presents an amount of storage space to the host for data storage. The storage space is physically comprised of the storage space provided by its constituent physical disks. The capacity of a volume is often less than the sum of capacity of its constituent physical disks owing to the additional redundancy introduced for fault tolerance. Host data written on the volume means that the host has written bytes of data starting at a logical block address of the space provided by the volume. The actual data may reside/span across one of more physical disks and physical block addresses.

There are erasure coding schemes which offer higher failure tolerance, but are very computationally intensive, thereby affecting Input/Output (I/O) performance. Erasure coding schemes are applicable to data storage so that the data may be reconstructible. The computational complexity of algorithms used for erasure coding, like Reed-Solomon, is very high, involving Galios field matrix multiplication. This results in a significant performance overhead on erasure coded volumes.

Storage disks are prone to failure, so that a resilience mechanism may provide for protection of data despite disk failures. RAID levels offer fault tolerance of up to two disks per volume. Fault tolerance of RAID 5 is one, and RAID 6 is two. A volume rebuild may be performed quickly to mitigate the risk of total volume failure. Erasure codes can offer higher degrees of fault tolerance, but are computationally intensive and have lower degrees of performance.

Data is stored in disks, a type of storage media, connected to the storage controller. This data is at risk of failure owing to disk failure. To ensure that the data is fault tolerant, there is a need to introduce redundancy of data written across disks. There are existing RAID levels 0, 1, 5, 6, 1E, 10, 50, 60 (10, 50 and 60 being nested RAID levels) and different erasure coding schemes which provide different methods of creating redundancy and storing the data. There are RAID levels which provide a failure tolerance of two disks while providing high I/O performance, compared to an erasure coding volume. There are erasure coding schemes which offer high failure tolerance, but are very computation intensive, thereby affecting I/O performance, compared to a RAID volume.

There is a lot of research in the area of erasure coding mostly employing polynomial encoding in Galois Field. Most industry implementations employ computationally intensive Reed-Solomon codes and locally repairable codes for full data recoverability. To repair a degraded volume with failed physical disks, the remaining physical disks containing data and the additional redundant data (parities), are read. If all the disks are involved in redundancy calculation and subsequently the repair, the method is called global repair involving global parity as the entire set of disks participate in forming the parity. If a subset of disks are involved in redundancy calculation and subsequently the repair, then the code is called a locally repairable code as the parity is local to a subset of disks.

There is a need to have tolerance for more than two disk failures and still offer high I/O performance.

SUMMARY

Aspects provide graph-based erasure code models based on polyhedrons using bitwise XOR operations for encoding and decoding data, and redundantly distributing data and parities among different data storage media.

Aspects provide a method having: splitting a data stripe into a number of data strips, wherein the number of data strips equals the number of vertices of a polyhedron and respective ones of the data strips corresponds to a respective vertex of the polyhedron; constructing a number of parities, wherein the number of parities equals the number of faces of the polyhedron and respective ones of the number of parities corresponds to a face of the polyhedron, wherein respective ones of the number of parities are constructed by a computational operation on the data strips corresponding to vertices incident to the face of the polyhedron corresponding to the respective parity; and distributing subsets of data strips and subsets of parities to subsets of storage media.

According to an aspect, there is provided a device comprising: a plurality of storage media; an erasure coding controller comprising: a processor; a memory storing computer-readable instructions that, when executed by the processor, cause the processor to: split data into a number of data strips, wherein the number of data strips equals the number of vertices of a polyhedron and each data strip corresponds to a vertex of the polyhedron; construct a number of parities, wherein the number of parities equals the number of faces of the polyhedron and respective ones of the number of parities corresponds to a face of the polyhedron, wherein respective ones of the number of parities is constructed by a computational operation on the data strips corresponding to vertices incident to the face of the polyhedron corresponding to the respective parity; and distribute subsets of data strips and subsets of parities to subsets of storage media.

An aspect provides a system comprising: a data storage network comprising: a plurality of storage nodes; a gateway erasure coding accelerator comprising; a processor; a memory storing computer-readable instructions that, when executed by the processor, cause the processor to: split data into a number of data strips, wherein the number of data strips equals the number of vertices of a polyhedron and respective ones of the data strip corresponds to a vertex of the polyhedron; constructing a number of parities, wherein the number of parities equals the number of faces of the polyhedron and respective ones of the number of parities corresponds to a face of the polyhedron, wherein respective parities are constructed by a computational operation on the data strips corresponding to vertices incident to the face of the polyhedron corresponding to each parity; and distributing subsets of data strips and subsets of parities to subsets of storage nodes of the plurality of storage nodes.

BRIEF DESCRIPTION OF THE DRAWINGS

The figures illustrate examples of graph-based erasure code models based on polyhedrons using bitwise XOR operations for encoding and decoding data, and redundantly distributing data and parities among different data storage media.

FIG. 3C shows a tetrahedron parity calculation for the tetrahedron code model shown in FIG. 3A.

FIG. 3D shows a Tetrahedron volume—eight drive data and rotating parity distribution for the model shown in FIG. 3A.

FIG. 3E shows a Tetrahedron volume—wherein three drives have failed, based on the model of FIG. 3A.

FIG. 3F shows a Tetrahedron volume—three failed drive data reconstruction for the drives identified in FIG. 3E.

FIG. 4C shows a parity calculation for the cube code model shown in FIG. 4A.

FIG. 4D shows a Cube volume—fourteen drive data and rotating parity distribution for the model of FIG. 4A.

FIG. 4E shows a Cube volume—wherein three drives have failed, based on the model of FIG. 4A.

FIG. 4F shows reconstructed data for the failed drives: Drive 1, Drive 5, and Drive 9 for the drives identified in FIG. 4E.

FIG. 5B shows the name and value for the respective parities identified in FIG. 5A.

FIG. 5C shows a dodecahedron parity calculation for the dodecahedron code model shown in FIG. 5A.

FIG. 5D shows a Dodecahedron volume—thirty-two drive data and rotating parity distribution for the model of FIG. 5A.

FIG. 5E shows a Dodecahedron volume—wherein five drives have failed, based on the model of FIG. 5A.

FIG. 5F shows reconstructed data for the failed drives: Drive 4, Drive 5, Drive 6, Drive 7, and Drive 8 for the drives identified in FIG. 5E.

FIGS. 8A through 8C show a flowchart diagram for a reconstruction/read workflow for a cube, whereby data strips are reconstructed for reads, and whereby data and parity strips are reconstructed for rebuild.

FIG. 10 shows characteristics for various parameters: RAID 5, RAID 6, Tetrahedron, Cube and Dodecahedron volumes.

FIG. 12 shows performance estimates (X times single drive) for various parameters.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DESCRIPTION

According to aspects of the invention, there are provided graph-based erasure code models based on polyhedrons using computational operations for encoding and decoding data, and redundantly distributing data and parities among different data storage media. Models may be based on polyhedrons, including regular polyhedrons. A regular polyhedron is a subset of class of polyhedrons with the chief distinction that all faces, edges and angles are symmetric. The symmetry may provide equal fault tolerance characteristics irrespective of combinations of storage medium units failing.

A non-regular polyhedron may provide asymmetric fault tolerance characteristics based on the combination of storage medium units failing. Polyhedrons may have face asymmetry, wherein parities generated may have varying amounts of redundancy embedded in them (based on the number of vertices in that face). This may effect the fault tolerance of the volume as the faces have different levels of redundancy information added. The volume's fault tolerance may be determined by the least possible fault tolerance considering all combinations of missing faces and vertices.

Aspects provide fault tolerance starting with three for cube, three for tetradedron, and five for dodecahedron.

Figure 13:
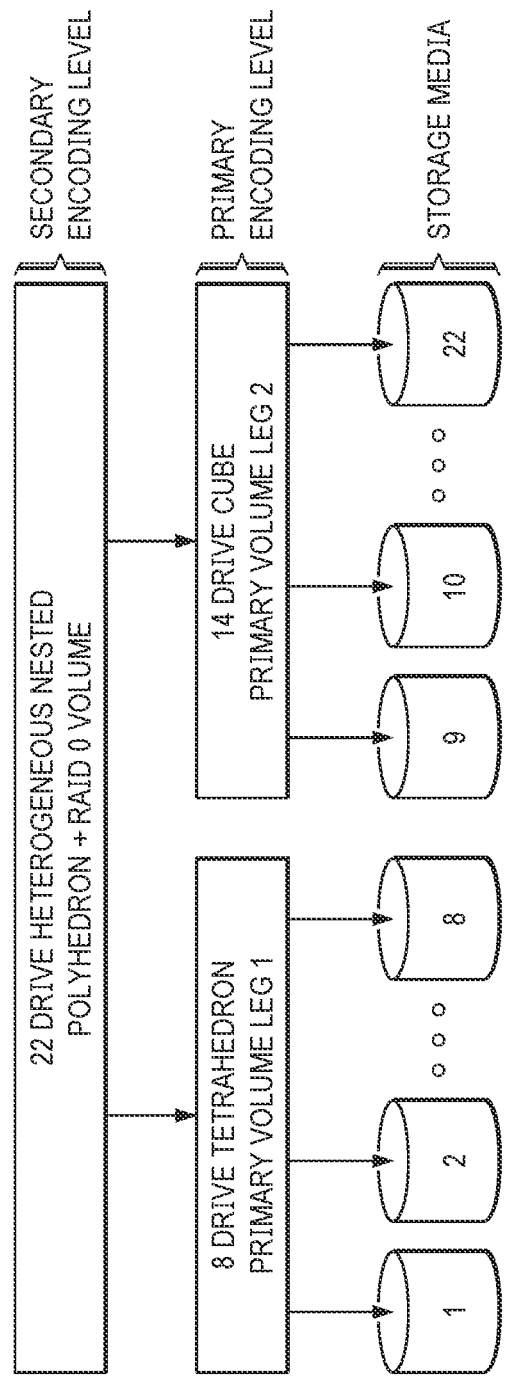
FIG. 13 shows heterogenous nesting.
Figure 14:
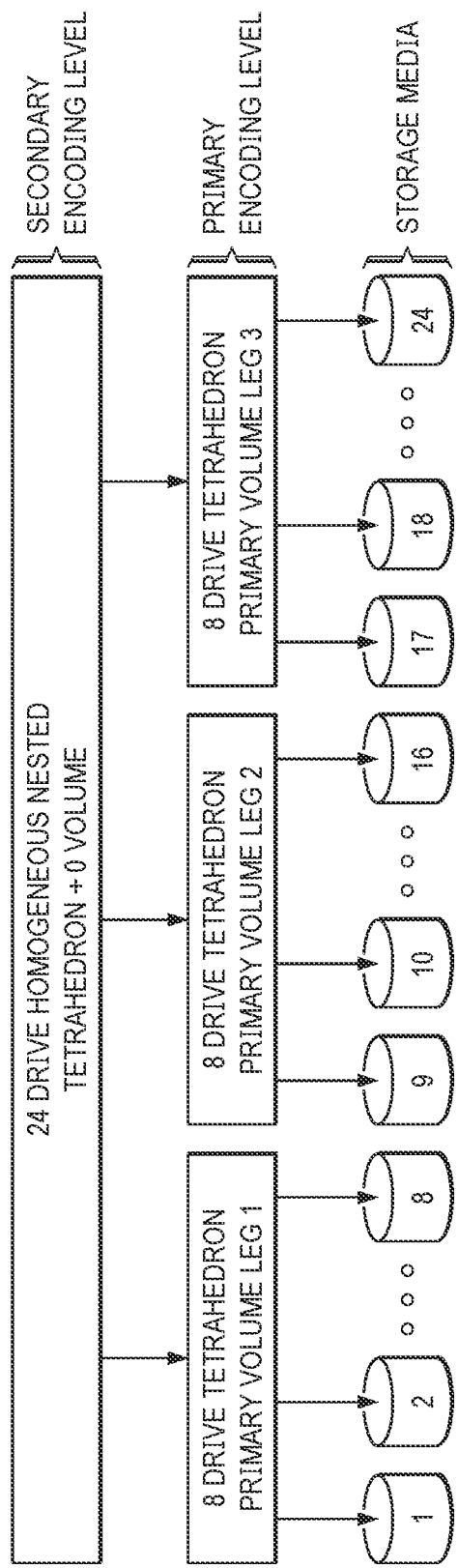
FIG. 14 shows homogeneous nesting.
Figure 15:
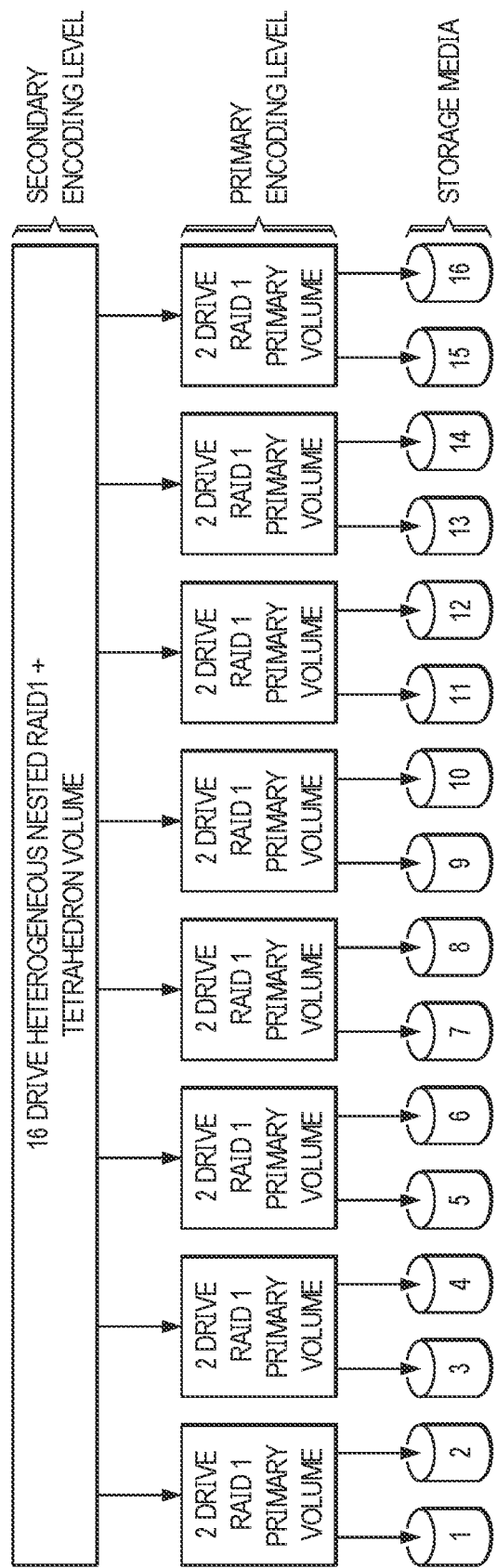
FIG. 15 shows nesting with polyhedron as the secondary encoding level and RAID1 as the primary encoding level.

Aspects provide nested levels. Polyhedron volumes can be used in nested encoding formats as both primary or non-primary levels. FIG. 13 shows heterogenous nesting. FIG. 14 shows homogeneous nesting. FIG. 15 shows nesting with polyhedron as the secondary encoding level and RAID1 as the primary encoding level. The primary encoding level indicates the encoding level which uses individual storage media directly as a source of storage. Non-primary encoding levels are levels of encoding which uses other encoded volumes as a source of storage. Each such primary encoded volume is referred to as a leg forming the non-primary volume. Polyhedron volumes can be configured in heterogeneous or homogeneous nesting. Nesting is heterogeneous if all the participants at a given encoding level are of a different encoding type. Nesting is homogeneous if all the participants at a given encoding level are of the same encoding type. Polyhedron volumes can be nested with RAID or erasure coded volumes at different levels. The fault tolerance of the overall nested volume is given by the least fault tolerance of individual legs. They can also be used in nested levels to provide better fault tolerance per leg. Nested levels indicate fault tolerance being applied in more than one layer. Using RAID as an example, RAID 10, 50, 60, 11, 51, 61 are nested RAID levels. For example, RAID 50 is a nested RAID level with RAID 5 being the primary RAID level and RAID 0 indicating the secondary RAID level. There could be three disks which make a leg of the volume implementing the RAID 5 (primary raid level). The additional layer of RAID 0 can be applied over multiple legs of RAID 5. Therefore the benefits of both RAID levels can be seen in a nested RAID level.

Aspects provide a method to introduce redundancy and store data on multiple storage media for providing better fault tolerance along with higher performance. A data stripe to be stored is split into multiple smaller data strips, and the respective strips are stored in different storage media like disks, respectively. These data strips may represent the vertices of a polyhedron. To introduce redundancy of data, multiple parities may be calculated and stored. The respective parities calculated may represent respective corresponding faces of the polyhedron. To compute a given parity, all data strips which represent the vertices of that face of the polyhedron may be encoded by a symmetric parity encoding and decoding method, which in one examples is bitwise XOR. The number of parities generated may be given by the number of faces of the polyhedron. The data strips and the generated parities for a given stripe may be distributed in different storage media. For example, a tetrahedron includes four vertices and four faces, and therefore four parities are calculated using three data vertices for the respective parity. For up to three disk failures, the remaining data strips and parity can be used to reconstruct the entire regular tetrahedron. To reconstruct a given parity face P of the tetrahedron, its adjacent faces, coincident edges, or constituent vertices are sufficient. The method may use bitwise XOR operations for encoding and decoding, which is computationally simple, associative and provides fast performance. The fault tolerance for the tetrahedron is three, cube is three, and the dodecahedron is five.

A polyhedron is a graph and can be represented mathematically as a function of vertices and faces (V, F), where V represents a set of vertices and F represents a set of faces. A volume is a logical construct of physical storage media which are grouped together exhibiting a pattern in data distribution and redundancy. For example, if there are three physical storage media using a pattern of distribution as outlined by the RAID level 5, the logical construct which provides the combined redundant space is called a RAID 5 volume. Where a polyhedron provides the distribution pattern, a logical construct that implements a polyhedron code using physical storage media is called a polyhedron volume.

The fault tolerant volume is represented by polyhedron (V, F) consisting of a set of data (V) and set of parity (F) such that the total number of storage disks in the volume is given by $|V|+|F|$. $|V|$ is the mathematical notation to indicate the count of elements in the set of vertices (V). $|F|$ is the mathematical notation to indicate the count of elements in set of parities (F). In the case of a volume where no disk failures have occurred, the (V) data strips may be read from individual storage disks (media) without any computational overhead for reconstruction. If respective faces of the polyhedron F has M vertices, then for up to $|M|+-1$ (M−1 to M+1) storage disk (media) failures, the missing data strips can be reconstructed using bitwise XOR operations, depending on the particular polyhedron. This is used for both data reads and for rebuilding the volume when the faulty storage disks (media) have been replaced. The storage overhead is given by $(|V|+|F|)/|F|$.

The polyhedron may be identified by the code (N, K, D) code, wherein N represents the total number of individual storage medium units (e.g., disks or drives), K represents the number of data vertices, and D represents the fault tolerance for the individual storage medium units. For a tetrahedron, the code is (8, 4, 3), wherein there are eight individual storage medium units (e.g., disks or drives), four data vertices, and up to three individual storage medium unit failures may be tolerated. A total of eight (8) disks are needed to distribute data modelled as a tetrahedron, which is the sum of vertices (4) and faces (4) of a tetrahedron representing four data and four parity strips. For a "cube" based erasure code, the code is (14, 8, 3) wherein there are fourteen individual storage medium units (e.g., disks or drives), eight data vertices, and up to three individual storage medium unit failures may be tolerated. A total of fourteen (14) disks are needed to distribute data modelled as a cube, which is the sum of vertices (8) and faces (6) of a cube representing eight data and six parity strips. For a dodecahedron, the code is (32, 20, 5), wherein there are thirty-two individual storage medium units (e.g., disks or drives), twenty data vertices, and up to five individual storage medium unit failures may be tolerated. A total of thirty-two (32) disks are needed to distribute data modelled as a dodecahedron, which is the sum of vertices (20) and faces (12) of a dodecahedron representing twenty data and twelve parity strips. Data and parity may be stored in storage media according to any storage pattern. Two example distribution patterns of the data and parity across different media include: (1) interleave media with both data and parity in a rotating manner; and (2) store parity in dedicated media and data on a different set of dedicated media.

The degree of fault tolerance given by the number of vertices in the face of a polyhedron may be greater than two. For example, in a tetrahedron, the degree of fault tolerance may be three. Using a tetrahedron as an example, the data may be reconstructed after random 1, 2, and 3 media failures.

Aspects provide a graph-based erasure code modeled on a polyhedron using XOR (Binary exclusive OR) operations. Aspects may provide a degree of fault tolerance greater than two (2). Aspects may have high performance and low computational overhead for high I/O performance. Aspects may provide an option to delay onset of volume rebuild after multiple disk failures. Drawing a comparison to RAID, generally when a RAID volume becomes degraded with a single drive failure, the storage controller automatically triggers a volume rebuild if there is a suitable replacement found for the failed disk. With the polyhedron code, a polyhedron volume rebuild can be programmed on the storage controller to start automatically only after it crosses a threshold number of failed disks, which can be less than or equal to the total fault tolerance provided by that polyhedron. Rebuild may be delayed because degraded polyhedron volumes may not see an immediate drop in performance, but rather the polyhedron volumes may see a gradual drop in performance proportional to the number of disk failures.

Aspects may provide local repairability to reduce overhead during rebuild. There are two broad ways of repairing the volume by reconstructing data on missing disks, namely global and local. In the global repair technique, all the other surviving disks are read to reconstruct missing data. This is analogous to the parity calculation technique which would use all the data disks to generate parity (example RAID 5). An advantage of locality of repair is that fewer disks are read to reconstruct a given piece of missing data as compared to reading all the disks in the case of global repair. This reduces the amount of data movement for reconstruction, and frees up the disk bandwidth for the host I/O. The result is that host I/O performance will be better when the volume is rebuilding and the rebuild will be faster because there is less data movement involved in the reconstruction.

Aspects may provide implementation feasibility using XOR available with existing hardware RAID assist engines. Other computational operations may also be used (e.g. arithmetic (+, −, *, / without limitation), comparison (<, >, =, without limitation), or logical (AND, OR, XOR, without limitation), which are available with existing hardware RAID assist engines.

As indicated above, a polyhedron code is an erasure code model which establishes a relationship between different subsets of data being stored by creating redundancies based on those subsets. Polyhedron is a geometric graph represented by (V, F). Polyhedron code (N, K, D) is a family of graphical erasure code, which is based on the geometrical concept of a polyhedron (V, F) where N=|V|+|F|, K=|V|, and D=|M|+−1 where |M| indicates the number of vertices in a given face of the polyhedron. A polyhedron code is associative in encoding/decoding by computing the parity using XORs instead of polynomial equations in Galois field, greatly reducing the computational overhead. Distributing the computed parity and the data across different disks may use a rotating distributed parity mechanism similar to the RAID 5 to utilize all the underlying disks efficiently.

An aspect provides the polyhedron family of erasure codes. Another aspect provides an algorithm for encoding/decoding and reconstructing data in constituent disks. Aspects provide a graph based systematic erasure code model and algorithm for encoding/decoding and reconstruction based on a polyhedron. Another aspect provides a computationally efficient method of parity calculation for the erasure code. There is an implementation of the polyhedron code with a method for distributing data and parity. According to an aspect, there is provided a distribution model for the data strip set and their corresponding parities. Fixed array geometries of 8, 14, 32 disks with volumes exhibiting storage overhead of 2×, 1.75× and 1.6×, respectively, may indicate that polyhedron codes are being used. Also, if fixed data patterns are written to the volume, the occurrence of XORed values of subsets of data in the constituent disks may be a clear indication of the polyhedron code in use.

The method and algorithm may be used by a storage controller which provides fault tolerance of underlying disks connected to it. The method and algorithm may also be used by storage accelerators which aggregate and accelerate Input/Output (I/O) to storage connected to a system. The method and algorithm may also be used by distributed network storage products which provide storage node failure protection. The method and algorithm may be implemented in the Input/Output (I/O) path to encode, distribute data as per the polyhedron code and read data per the distribution for decoding and reconstruction.

Figure 1:
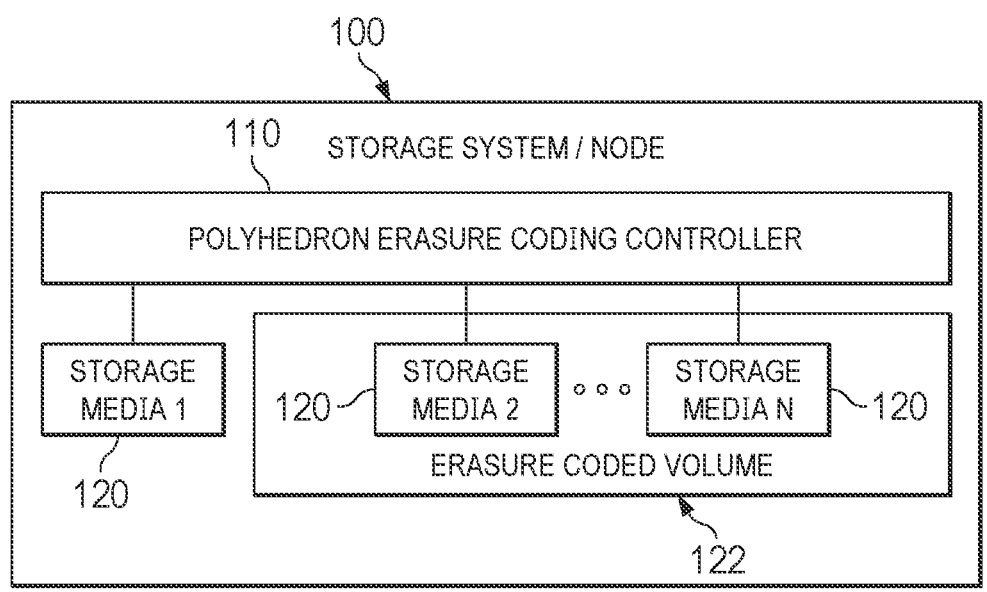
FIG. 1 shows a block diagram of a storage system having an erasure coding controller and nodes.

FIG. 1 shows a block diagram of a storage system 100 having a polyhedron erasure coding controller 100 and storage disks 120. In this case, respective storage media are storage disks 120, which may include any number (N) of storage disks 120. All or a subset of the disks 120 may be included in an erasure coded volume 122.

Figure 2:
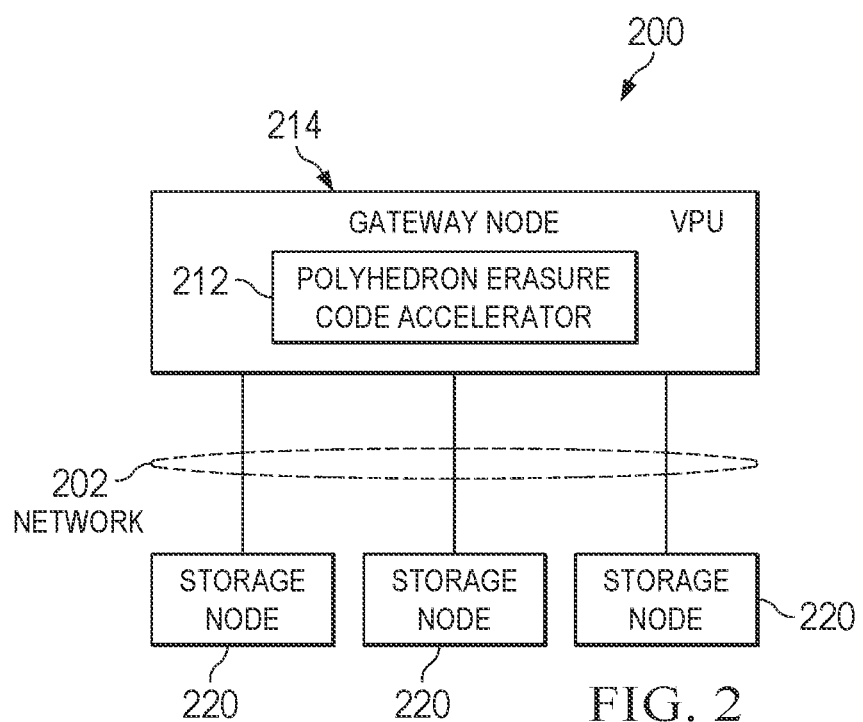
FIG. 2 shows a block diagram of a storage system having a gateway node with an erasure code accelerator and a plurality of storage nodes, wherein the gateway node and the storage nodes are connected via a network.

FIG. 2 shows a block diagram of a storage system 200 having a gateway node 214 with a polyhedron erasure code accelerator 212 and a plurality of storage nodes 220 which provide several bytes of data storage, wherein the gateway node 214 and the storage nodes 220 are connected via a network 202.

Figures 3A, 3B:
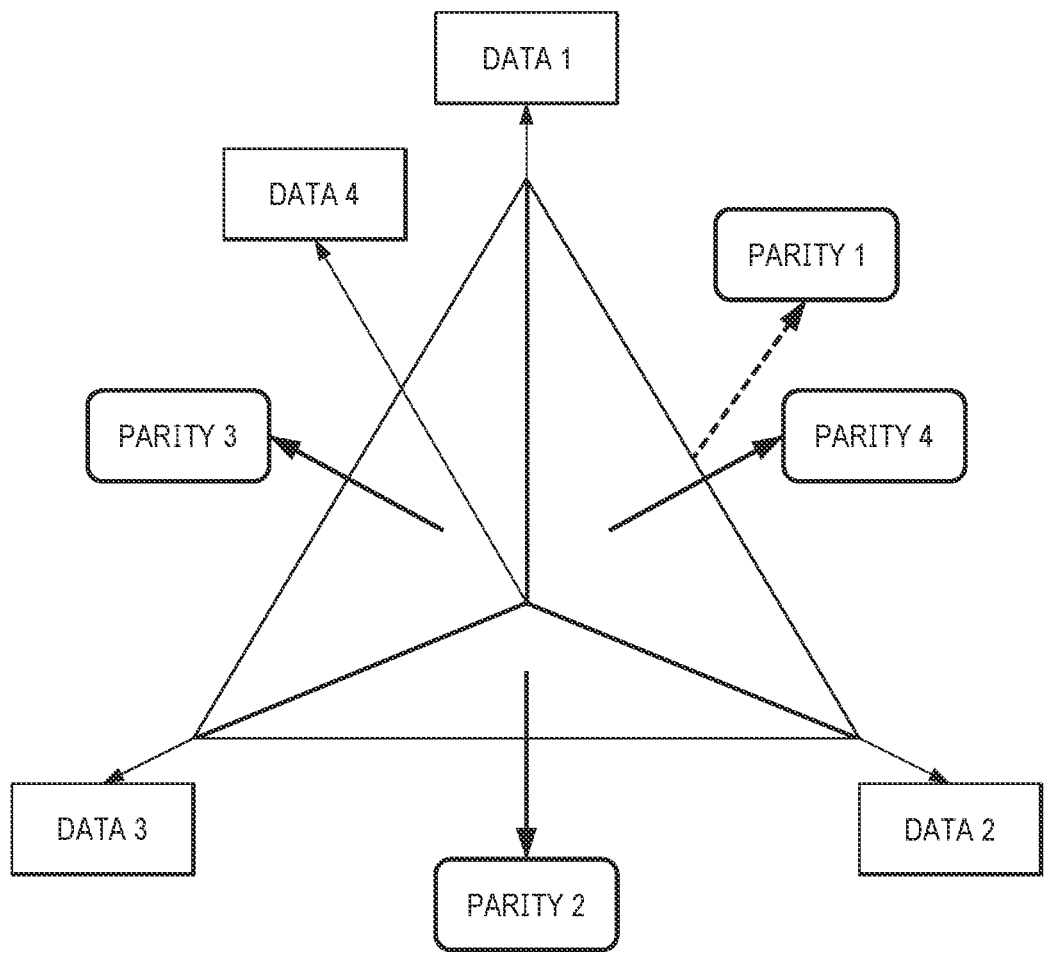
FIG. 3A shows a tetrahedron erasure code model having four input data streams and four parities.
FIG. 3B shows a table indicating how the model of FIG. 3A produces four parities by XORing data input streams.

FIG. 3A shows a tetrahedron code model having four input data streams, which respective data streams representing data strips: Data 1, Data 2, Data 3, and Data 4, i.e. a data stripe was split into 4 data strips. The model is a "regular tetrahedron" based erasure code. Specifically, it is a (8, 4, 3) code where eight storage medium units will be used, four data vertices, with a resultant four parities representing vertices, and up to three individual storage medium unit failures may be tolerated. The method utilizing the tetrahedron code model produces four parities: parity 1, parity 2, parity 3, and parity 4 according to the parities shown in FIG. 3B. In particular, parity 1 is calculated based on Data 1, Data 2 and Data 3, e.g., Data 1 XOR Data 2 XOR Data 3; parity 2 is calculated based on Data 2, Data 3 and Data 4, e.g., Data 2 XOR Data 3 XOR Data 4; parity 3 is calculated based on Data 3, Data 4 and Data 1, e.g., Data 3 XOR Data 4 XOR Data 1; and parity 4 is calculated based on Data 4, Data 1 and Data 2, e.g., Data 4 XOR Data 1 XOR Data 2. Implementation schemes include rotating parity and fixed parity distribution. Once the polyhedron model is constructed, the order in which the vertices and parities are distributed across various storage disks is determined. In the case of rotating parity, the parities are distributed in a rotating manner among storage disks using a parity shift factor to determine the offset of rotation.

FIG. 3B shows a tetrahedron parity calculation for the tetrahedron code model shown in FIG. 3A. FIG. 3A shows the layout of data geometrically on a regular tetrahedron and visually represents data and parity corresponding to a three-dimensional solid, wherein the respective vertices are associated and labelled with a Data <Identifier>. Each face represents a parity labelled with a Parity <Identifier>. FIG. 3B shows a tabular representation of the information shown in FIG. 3A, which corresponds to one full stripe of data, and indicating the parity calculation. The relationship between a given Parity <Identifier> with three Data <Identifiers> is indicated in the table. The respective Faces in the tetrahedron have three vertices respectively associated with the incident face of the tetrahedron corresponding to the respective parity, which are involved in the XOR operation to generate the parity and "circle +" indicates bitwise XOR operation. In FIG. 3B, each row indicates the various data elements that are involved in computing a parity. The four rows grouped together represent one complete polyhedron. One full stripe of the data volume represents one complete polyhedron. Where FIG. 3B shows one full stripe of data and parities corresponding to one tetrahedron, FIG. 3C shows in information in FIG. 3B (tetrahedron No. 1) and the data and parities corresponding to an additional seven tetrahedrons for a total of eight tetrahedrons representing the entire data volume. In FIG. 3D, eight full stripes of data and parities are distributed across eight storage drives, representing the entire data volume.

FIG. 3D shows a Tetrahedron volume—8 drive data and rotating parity distribution. Respective cells represent a respective data strip on a constituent storage media. Respective rows represent respective data stripes on the tetrahedron volume. Four rows correspond to one complete tetrahedron. A parity shift factor between stripes equals 1. The parity shift factor indicates the number of storage disks to be used as an offset between successive stripes of data (each row on FIG. 3D) for storing parity in a rotating fashion. For example, consider the first two rows in FIG. 3D. The first row or Stripe 1 contains: Data 1, Data 2, Data 3, Data 4, Parity 1, Parity 2, Parity 3, and Parity 4. The second row or Stripe 2 contains: Parity 8, Data 5, Data 6, Data 7, Data 8, Parity 5, Parity 6, and Parity 7. In the first row or Stripe 1, the first data element is stored at column 1 (Storage Drive 1) and the first parity element (Parity 1) is stored at column 5 (Storage Drive 5). In the second row or Stripe 2, the parity shift factor of 1 is applied, as it is to each subsequent row. Therefore the first data element of Stripe 2 is stored at column 2 (Storage Drive 2) and first parity element of Stripe 2 is stored at column 6 (Storage Drive 6). Essentially between two stripes or rows, the location of various elements shift to the right by an offset of one (parity shift factor=1) while the order of the strips (individual cells in the table) within the row remains constant.

In the case of rotating parity distribution as shown in FIG. 3D, the parities are distributed on different columns (storage disks). In a given column (storage disk), both data and parity are stored for different stripes of data/parities.

In the case of a fixed parity distribution (not shown), FIG. 3D would have had columns (storage disks) which store only data or parity, but not both. Storage disks 1, 2, 3, and 4 would be used to store data strips and storage disks 5, 6, 7, and 8 would be used to store parity strips. The same would be repeated in each row which indicates successive stripes.

FIG. 3E shows the example of FIG. 3D, wherein three drives have failed. In this example Drive 1, Drive 2*, and Drive 3* have failed, wherein an "*" indicated the storage drive has failed.

FIG. 3F shows how the data of the failed drives of FIG. 3E may be reconstructed. In this example, the X'-X are reconstructed prior to use with a pipelined operation. When there are multiple failed storage disks, as in this example case, multiple strips of data/parity are missing and need to be reconstructed. The order in which the reconstruction of the strips commences is determined based on the elements that participate in the reconstruction. If reconstruction participants are also missing, then the missing participants may be reconstructed first. X' is the reconstruction of X and indicates that X is to be reconstructed before X may be used as a participant in another reconstruction operation. FIG. 3F illustrates reconstruction where storage drives 1*, 2*, and 3* have failed.

Figures 4A, 4B:
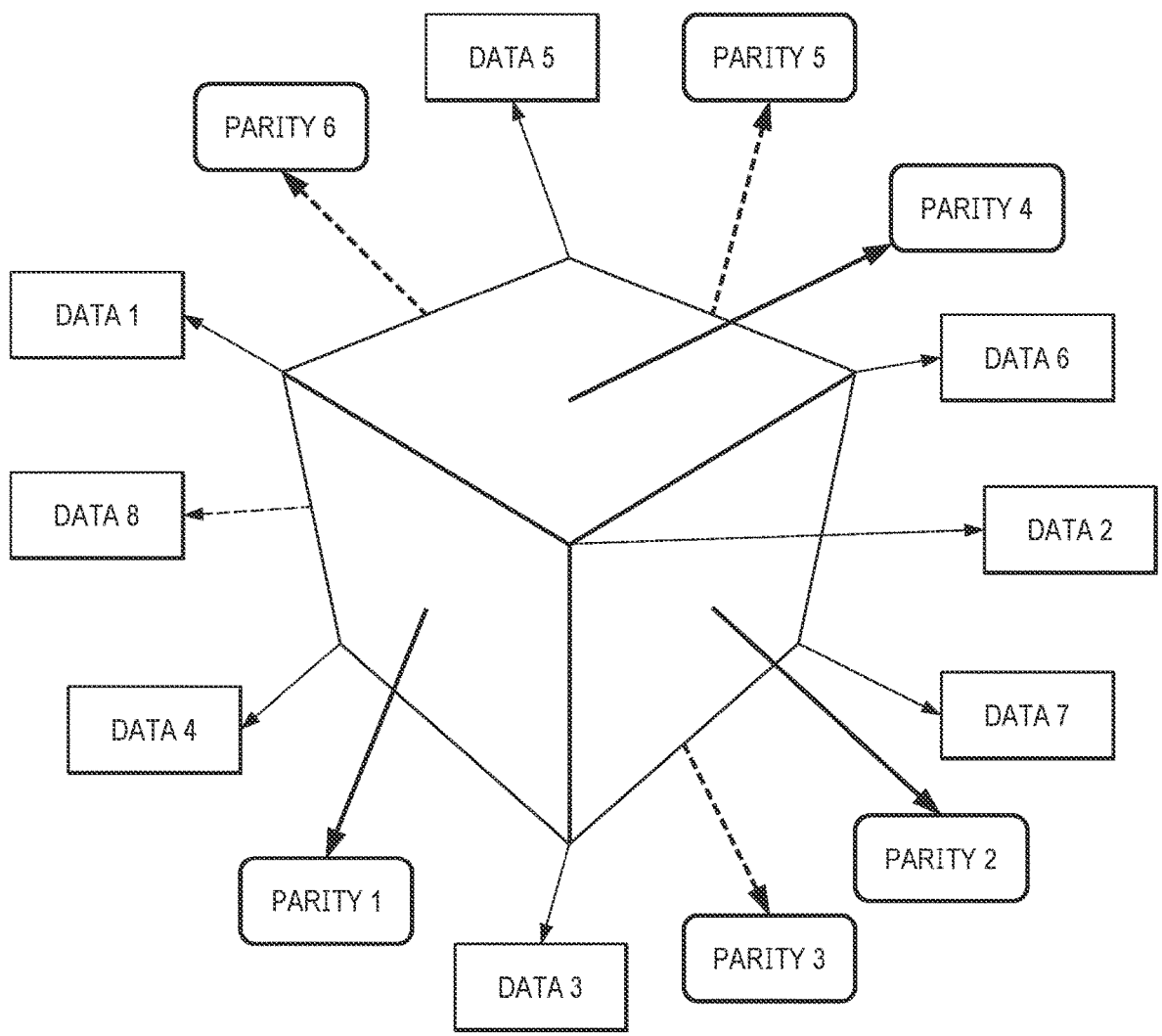
FIG. 4A shows a cube code model with eight input data streams and six parities.
FIG. 4B shows the name and value for the respective parities identified in FIG. 4A.

FIG. 4A shows a polyhedron model with a cube example, with eight input data streams, i.e. a data stripe has been split into eight data strips and six parities which are associated with the cube model. The model is a "regular cube" based erasure code. Specifically, the model is a (14, 8, 3) code where fourteen storage medium units will be used, eight vertices represent data, with a resultant six parities representing faces and up to three individual storage medium unit failures may be tolerated. FIG. 4B shows the name and value for respective parities identified in FIG. 4A. In particular, Parity 1 is calculated based on Data 1, Data 2, Data 3 and Data 4, e.g., Data 1 XOR Data 2 XOR Data 3 XOR Data 4; Parity 2 is calculated based on Data 2, Data 6, Data 7 and Data 3, e.g., Data 2 XOR Data 6 XOR Data 7 XOR Data 3; Parity 3 is calculated based on Data 3, Data 4, Data 8 and Data 7, e.g., Data 3 XOR Data 4 XOR Data 8 XOR Data 7; Parity 4 is calculated based on Data 5, Data 6, Data 2 and Data 1, e.g., Data 5 XOR Data 6 XOR Data 2 XOR Data 1; Parity 5 is calculated based on Data 5, Data 6, Data 7 and Data 8, e.g., Data 5 XOR Data 6 XOR Data 7 XOR Data 8; and Parity 6 is calculated based on Data 4, Data 1, Data 5 and Data 8, e.g., Data 4 XOR Data 1 XOR Data 5 XOR Data 8. Implementation schemes include rotating parity and fixed parity distribution.

FIG. 4C shows a parity calculation for the cube code model shown in FIG. 4A. The respective faces in the cube have four vertices respectively associated with the incident face of the cube corresponding to the respective parity, which are involved in the XOR operation to generate the parity and "circle +" indicates bitwise XOR operation. FIG. 4B shows the parities calculated for one stripe of data. FIG. 4C shows the same stripe of data and three additional stripes of data for a total of four stripes of Binary XOR parity calculations. Respective stripes have six parities and eight data, so four stripes constitute twenty-four parties. FIG. 4C describes parity calculations of all parities which are seen in FIGS. 4D, 4E and 4F. FIG. 4C shows four groups of data corresponding to four cube polyhedrons for parities 1-6, 7-12, 13-18, and 19-24, respectively.

FIG. 4D shows a Cube volume—14 drive data and rotating parity distribution. Respective cells represent respective data strips on a constituent storage media. Respective rows represent respective data stripes on the cube volume. The parity shift factor between stripes equals one (1).

FIG. 4E shows cube volume—3 drive failure, wherein Drive 1*, Drive 5*, and Drive 9* failed.

FIG. 4F shows how the data of the failed drives of FIG. 4E may be reconstructed. When there are multiple failed storage disks, as in this example case, multiple strips of data/parity are missing and need to be reconstructed. The order in which the reconstruction of the strips commences is determined based on the elements that participate in the reconstruction. If reconstruction participants are also missing, then the missing participants may be reconstructed first. X' is the reconstruction of X and indicates that X is to be reconstructed before X may be used as a participant in another reconstruction operation. FIG. 4F illustrates reconstruction where storage drives 1*, 5* and 9* have failed. Here, Parity 12, Data 12 and Data 16 are missing and need to be reconstructed. Data 12 and Data 16 can be reconstructed first as all of their reconstruction participants are present in the non-failed storage drives. Reconstructed Data 12 and Data 16 are indicated by a single apostrophe as Data 12' and Data 16'. However, Data 12 and Data 16 are participants in the reconstruction of Parity 12, so Data 12 and Data 16 first need to be reconstructed before attempting a reconstruction on Parity 12. Therefore, Parity 12 may be reconstructed in a second iteration after Data 12 and Data 16 have been reconstructed, indicated by Parity 12".

Parity 12" = Data 12' ⊕ Data 9 ⊕ Data 13 ⊕ Data 16'
Data 12' = Parity 7 ⊕ Data 9 ⊕ Data 10 ⊕ Data 11
Data 16' = Parity 11 ⊕ Data 13 ⊕ Data 14 ⊕ Data 15

Figure 5A:
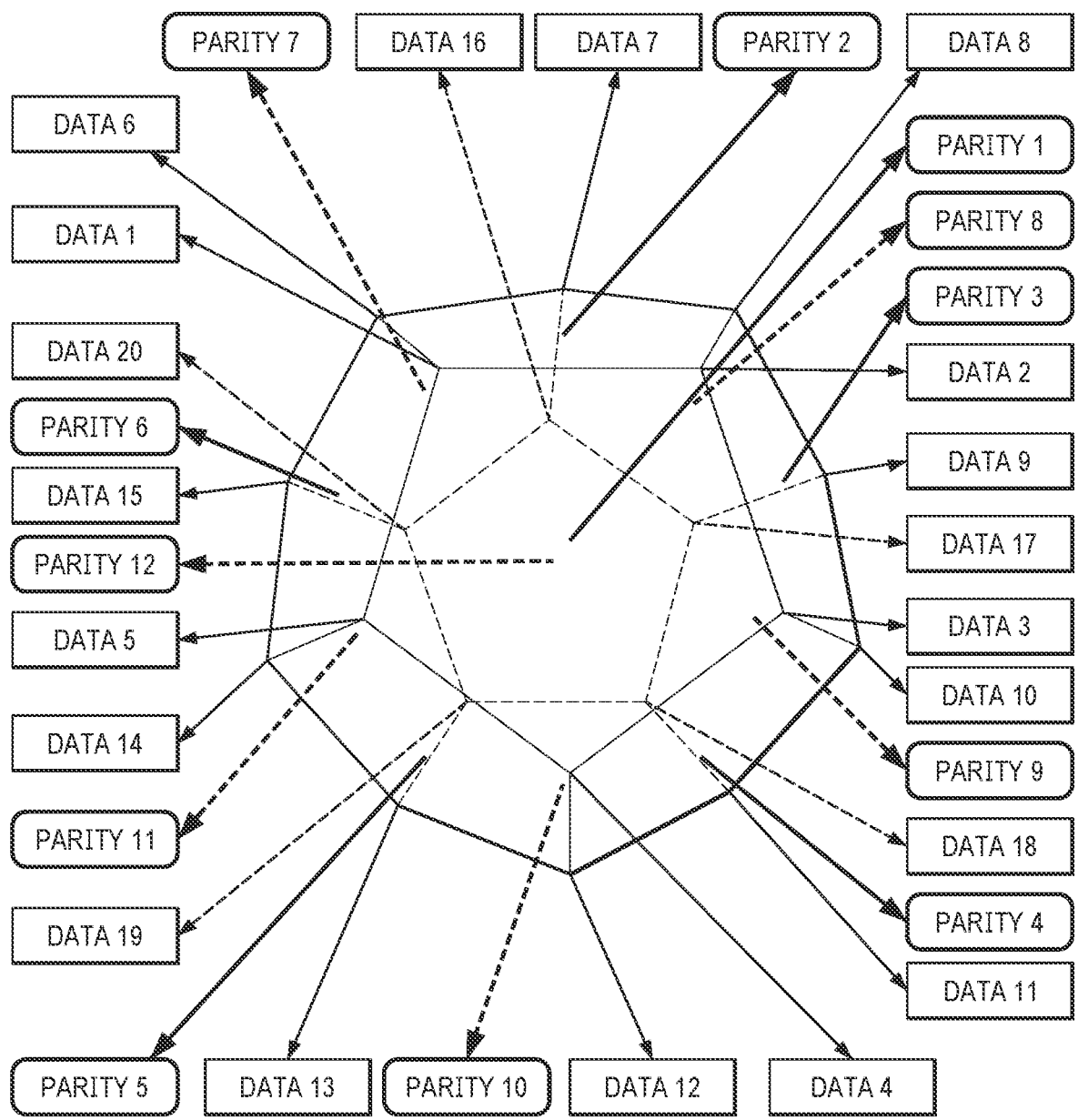
FIG. 5A shows a dodecahedron code model with twenty input data streams and twelve parities.

FIG. 5A shows a dodecahedron code model with twenty input data streams, i.e. a data stripe was split into 20 data strips. The model is a "regular dodecahedron" based erasure code. Specifically, the model is a (32, 20, 5) code where 32 storage medium units will be used, 20 data vertices, with a resultant 12 parities representing vertices, and up to five individual storage medium unit failures may be tolerated. FIG. 5B shows how the 12 parities may be calculated. In particular, Parity 1 is calculated based on Data 1, Data 2, Data 3, Data 4 and Data 5, e.g., Data 1 XOR Data 2 XOR Data 3 XOR Data 4 XOR Data 4; Parity 2 is calculated based on Data 1, Data 6, Data 7, Data 8 and Data 2, e.g., Data 1 XOR Data 6 XOR Data 7 XOR Data 8 XOR Data 2; Parity 3 is calculated based on Data 2, Data 8, Data 9, Data 10 and Data 3, e.g., Data 2 XOR Data 8 XOR Data 9 XOR Data 10 XOR Data 3; Parity 4 is calculated based on Data 3, Data 10, Data 11, Data 12 and Data 4, e.g., Data 3 XOR Data 10 XOR Data 11 XOR Data 12 XOR Data 4; Parity 5 is calculated based on Data 4, Data 12, Data 13, Data 14 and Data 5, e.g., Data 4 XOR Data 12 XOR Data 13 XOR Data 14 XOR Data 5; Parity 6 is calculated based on Data 5, Data 14, Data 15, Data 6 and Data 1, e.g., Data 5 XOR Data 14 XOR Data 15 XOR Data 6 XOR Data 1; Parity 7 is calculated based on Data 6, Data 7, Data 16, Data 20 and Data 15, e.g., Data 6 XOR Data 7 XOR Data 16 XOR Data 20 XOR Data 15; Parity 8 is calculated based on Data 7, Data 8, Data 9, Data 17 and Data 16, e.g., Data 7 XOR Data 8 XOR Data 9 XOR Data 17 XOR Data 16; Parity 9 is calculated based on Data 9, Data 10, Data 11 Data 18 and Data 17, e.g., Data 9 XOR Data 10 XOR Data 11 XOR Data 18 XOR Data 17; Parity 10 is calculated based on Data 11, Data 12, Data 13, Data 19 and Data 18, e.g., Data 11 XOR Data 12 XOR Data 13 XOR Data 19 XOR Data 18; Parity 11 is calculated based on Data 13, Data 14, Data 15, Data 20 and Data 19, e.g., Data 13 XOR Data 14 XOR Data 15 XOR Data 20 XOR Data 19; and Parity 12 is calculated based on Data 16, Data 17, Data 18, Data 19 and Data 20, e.g., Data 16 XOR Data 17 XOR Data 18 XOR Data 19 XOR Data 20. Implementation schemes include rotating and fixed parity distribution.

FIG. 5C shows a parity calculation for the dodecahedron code model shown in FIG. 5A. The respective faces in the dodecahedron have five vertices respectively associated with the incident face of the dodecahedron corresponding to the respective parity, which are involved in the XOR operation to generate the parity and "circle +" indicates bitwise XOR operation. FIG. 5B shows the parities calculated for one stripe of data. FIG. 5C shows that stripe of data and a second stripe of data for a total of two stripes of Binary XOR parity calculation. Respective stripes contain twenty data and twelve parities, resulting in twenty-four parities for the data volume. The "circle +" character indicates a Binary XOR operation. FIG. 5C describes the calculations of all parities seen in FIGS. 5D, 5E, and 5F.

FIG. 5D shows a Dodecahedron volume—32 drive data and rotating parity distribution. Respective cells represent respective data strips on a constituent storage media. Respective rows represent respective data stripes on the dodecahedron volume. The parity shift factor between stripes equals one (1).

FIG. 5E shows the example of FIG. 5D where 5 drives have failed. In this example Drive 4, Drive 5, Drive 6, Drive 7, and Drive 8 have failed.

FIG. 5F shows how the data of the failed drives of FIG. 5E may be reconstructed.

Figure 6:
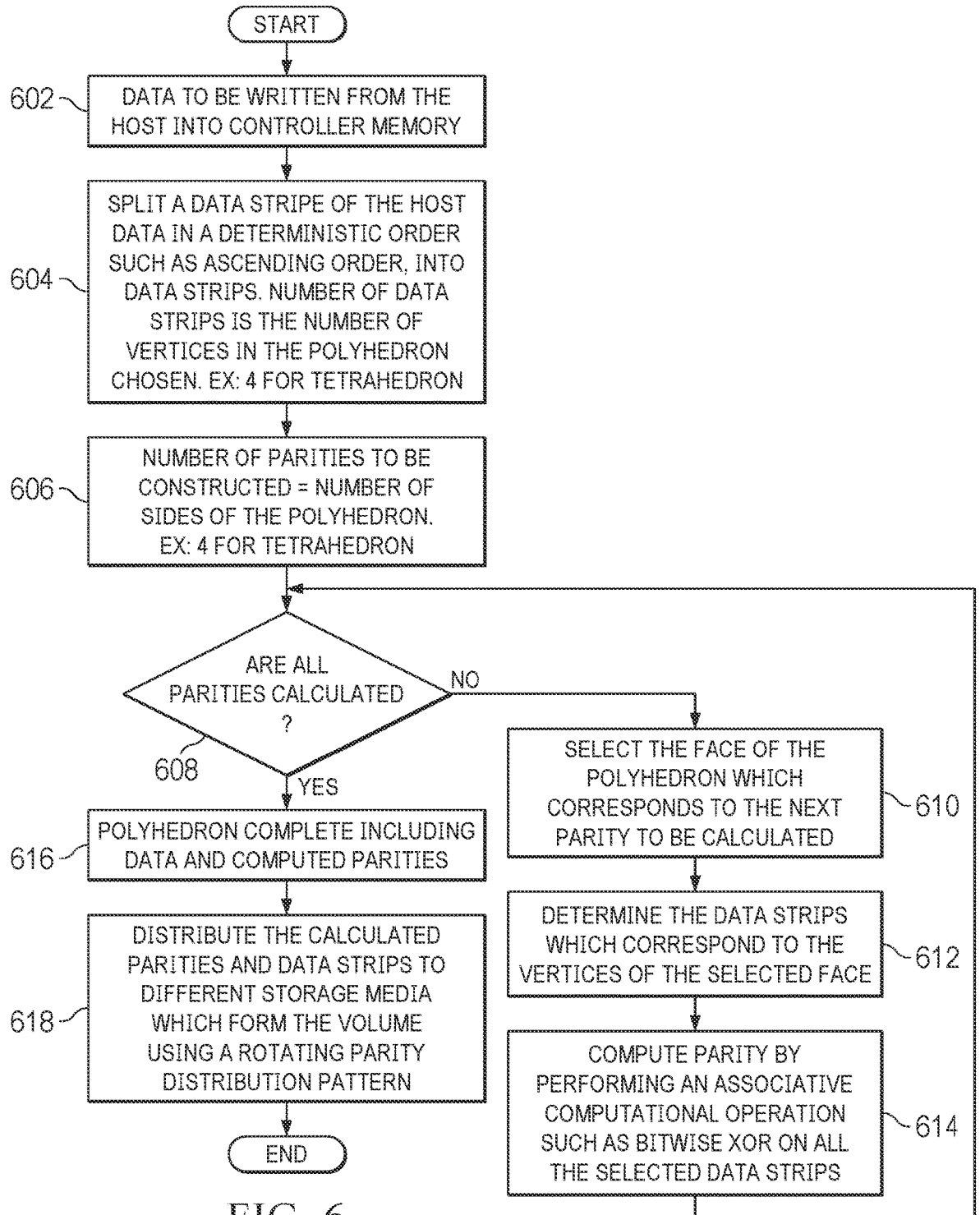
FIG. 6 shows a flowchart diagram for a write workflow.

FIG. 6 shows a flowchart diagram for a write workflow. The data is transferred 602 from the host into a controller memory. A data stripe of the host data is split 604 in a deterministic order, such as ascending order, into data strips. The number of data strips is the number of vertices of the polyhedron chosen. For example, if the chosen polyhedron is a tetrahedron, then the number of data strips is four. Parities are then constructed 606, wherein to compute a given parity, all data strips which represent the vertices of a respective face of the polyhedron are utilized. In one example the data strips of the vertices are bitwise XORed to calculate the respective parities. The number of parities to be constructed equals the number of faces of the polyhedron. For example, if the chosen polyhedron is a tetrahedron, then the number of parities is four. It is then determined whether all parities have been calculated 608. If NO, then the face of the polyhedron corresponding to the next parity to be calculated is selected 610. The data strips corresponding to the vertices of the selected face are determined 612. The parity is computed 614 by performing a symmetric parity encoding method, which on example is by performing a computational operation on all the selected data strips. The computational operation may be bitwise XOR. When it is determined that all parities have been calculated 608, then the encoding for the polyhedron is completed 616, including encoding the data and computing the parities, by looping through multiple iterations of blocks 608, 610, 612, and 612 to complete the various missing pieces of the polyhedron where there is one iteration per parity to be calculated, wherein this is the exit condition for the encoding loop which generates the parities to enable reconstruction of any missing entities (missing data and parities). The data strips and the calculated parities are distributed 618 to different storage media that form the volume, wherein one example distribution pattern is a rotating parity distribution pattern. A rotating parity distribution may allow the drives to be exercised during read workloads. In the case of dedicated parity, the dedicated data disks may be used for read workloads, which may lead to lower performance.

An example of face based reconstruction for a given data stripe DS on a tetrahedron volume T, if Data1, Data2, Data3 and Data4 are missing (see FIGS. 3A-3F), may be performed as follows:

1. V = (Data1, Data2, Data3, Data4)
   F = (Parity1, Parity2, Parity3, Parity4)
   MV = (Data1, Data2, Data3, Data4),
   MF = ( ).

| | |
|---|---|
| 2. | Next missing data strip = Data1. Faces incident to Data 1 = (Parity1, Parity3, Parity4) |
| 3. | Data1 = Parity1 XOR Parity3 XOR Parity4 |
| 4. | MV = (Data2, Data3, Data4) |
| 5. | Next missing data strip = Data2. Faces incident to Data 2 = (Parity4, Parity1, Parity2) |
| 6. | Data2 = Parity4 XOR Parity2 XOR Parity1 |
| 7. | MV = (Data3, Data4) |
| 8. | Next missing data strip = Data3. Faces incident to Data 3 = (Parity1, Parity2, Parity3) |
| 9. | Data3 = Parity1 XOR Parity2 XOR Parity3 |
| 10. | MV = (Data4) |
| 11. | Next missing data strip = Data4. Faces incident to Data 4 = (Parity2, Parity3, Parity4) |
| 12. | Data4 = Parity2 XOR Parity3 XOR Parity4 |
| 13. | MV = ( ). All data strips have been reconstructed. |

Figure 7A:
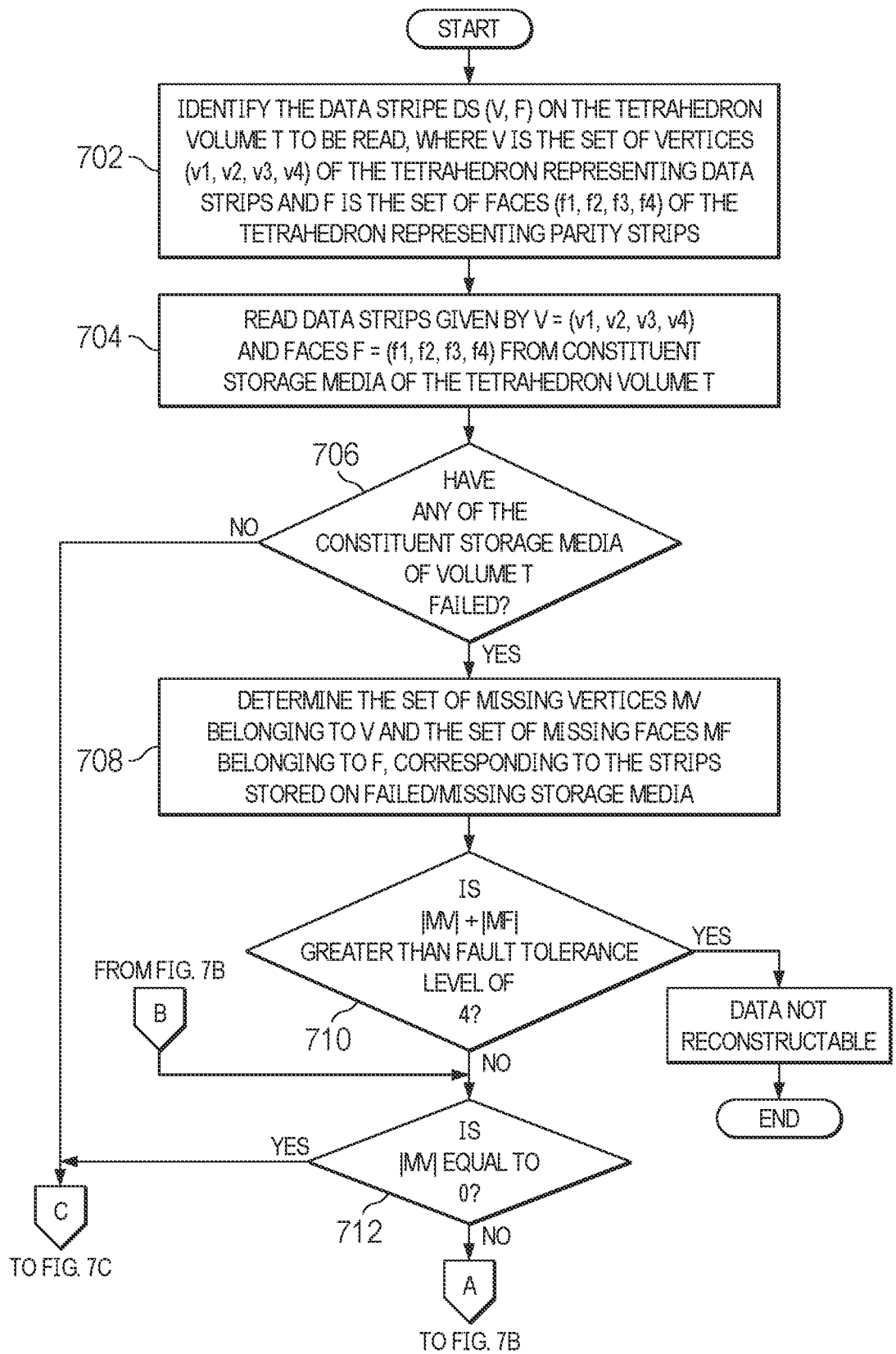
FIGS. 7A through 7C show a flowchart diagram for a reconstruction/read workflow for a tetrahedron, whereby data strips are reconstructed for reads, and whereby data and parity strips are reconstructed for rebuild.
Figure 7B:
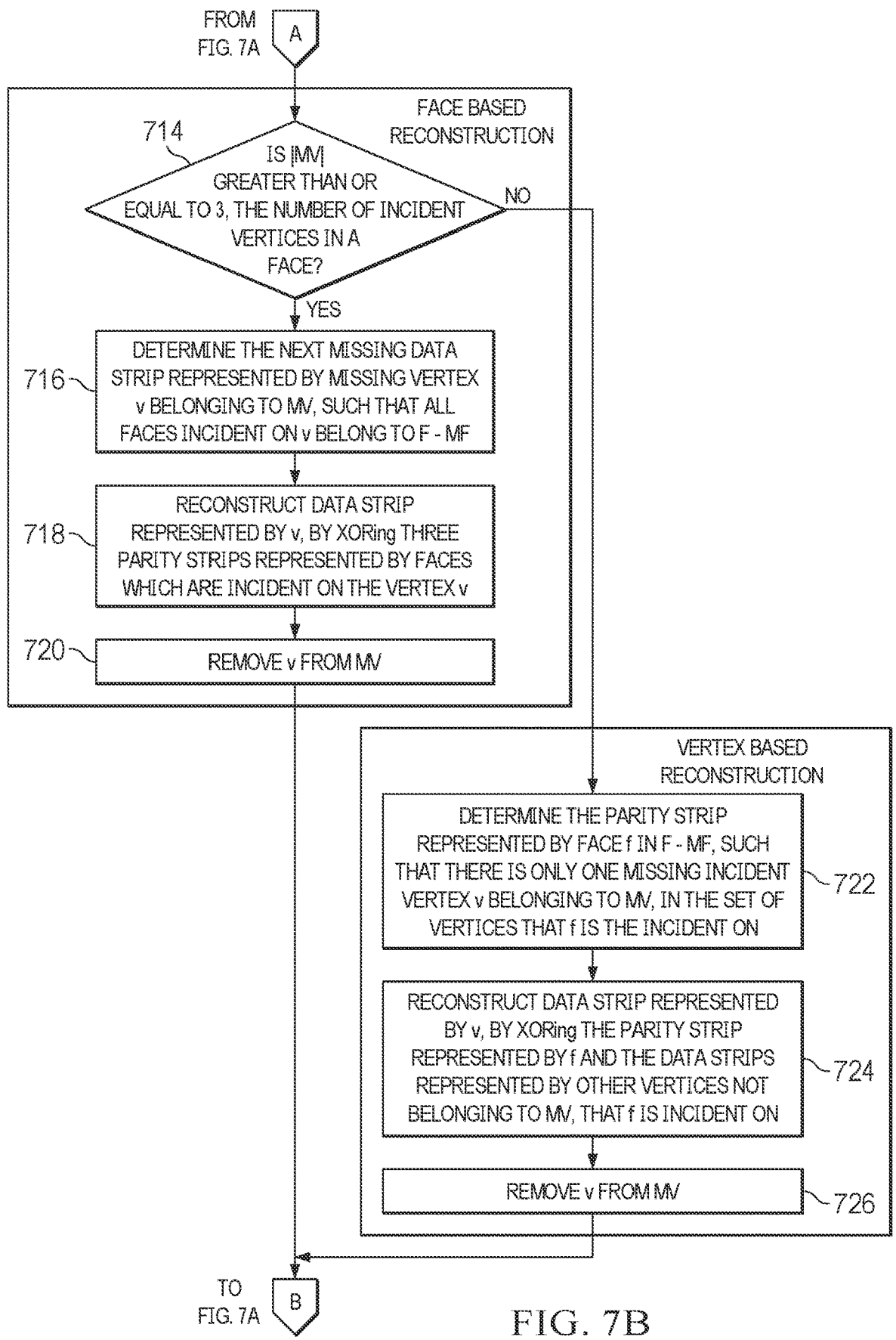
Figure 7C:
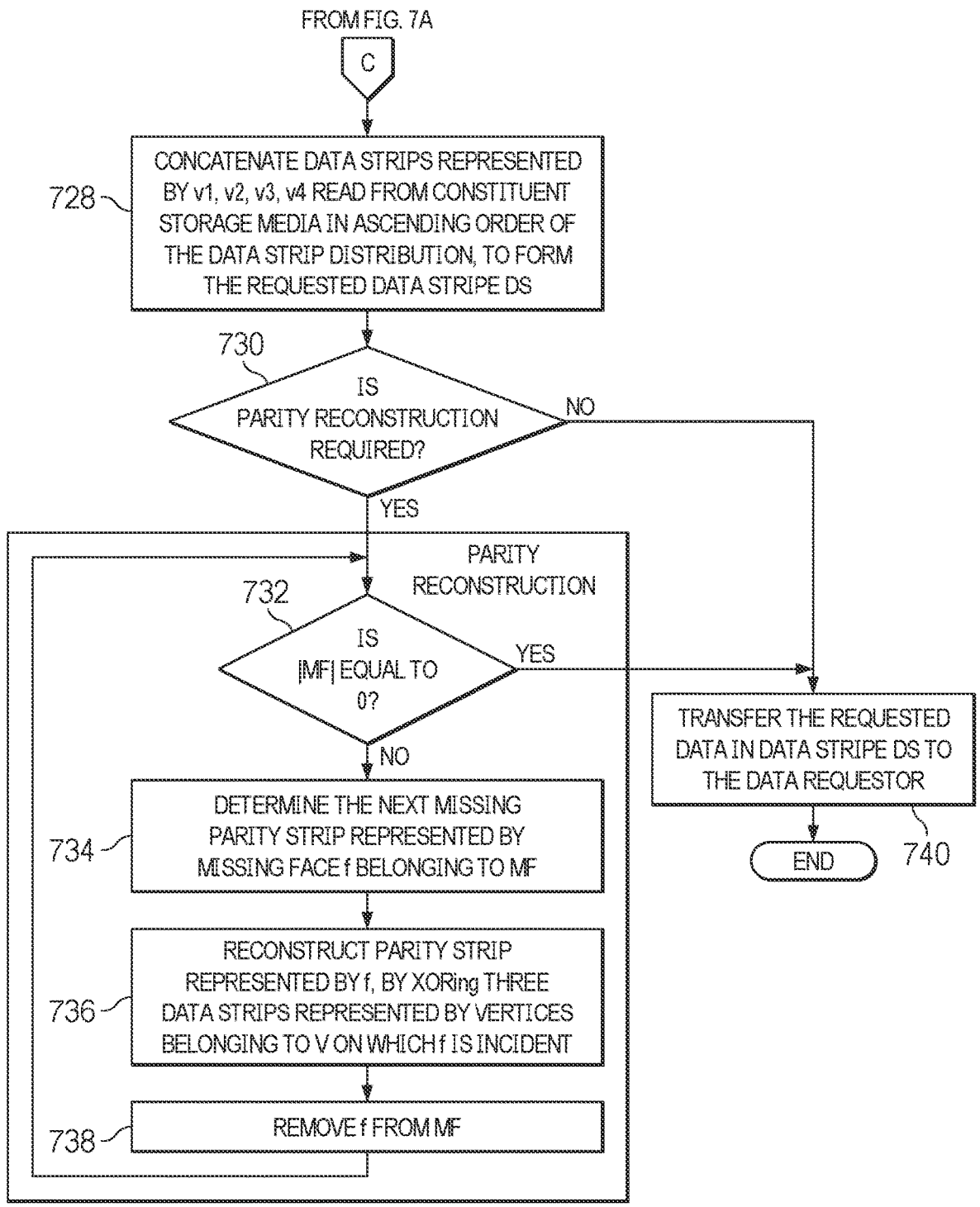

FIGS. 7A through 7C show a flowchart diagram for a reconstruction/read workflow for a tetrahedron, whereby data strips are reconstructed for reads, and whereby data and parity strips are reconstructed for rebuild. The data stripe DS (V,F) on the Tetrahedron volume T to be read is identified 702, where V is the set of vertices (v1,v2,v3,v4) of the tetrahedron representing data strips and F is the set of faces (f1,f2,f3,f4) of the tetrahedron representing parity strips. Data strips given by V=(v1,v2,v3,v4) and faces F=(f1,f2,f3,f4) are read 704 from constituent storage media of the Tetrahedron volume T. It is then determined 706 whether any of the constituent storage media of volume T have failed. If NO, meaning no constituent storage media have failed, then data strips are read 728 and concatenated in a deterministic order, such as an ascending order, of the data strip distribution to form the requested data stripe DS, and if YES, the set of missing vertices MV belonging to V and the set of missing faces MF belonging to F are determined 708, corresponding to the strips stored on failed/missing storage media. It is then determined 710 whether the cardinality of MV plus the cardinality of MF is greater than a fault tolerance level of three (3). If YES, then the data is not reconstructable and the process ends. If NO, then it is determined 712 whether the cardinality of MV is equal to zero. If YES, meaning the cardinality of MV is equal to zero, then data strips are read 728 and concatenated in ascending order of the data strip distribution to form the requested data stripe DS, and if NO, face based reconstruction of the missing vertices are performed. To reconstruct the missing vertices, it is determined 714 whether the cardinality of MV is equal to three, the number of incident vertices to a face. If NO, then vertex based reconstruction is performed, and if YES, the next missing data strip represented by missing vertex v belonging to MV is determined 716, such that all faces incident to v are not missing, belonging to the set of present faces given by F minus MF (F−MF). This condition is to pick vertices that have associated faces, which are still present. F indicates a set of all faces of the tetrahedron and MF indicates all the missing faces. F minus MF (F−MF) indicates a set of faces that are present (not missing). If all faces are present, then MF is an empty set. Present faces and present vertices may be used for reconstruction. The data strip represented by v is reconstructed 718 by XORing three parity strips represented by faces which are incident to the vertex v. The vertex v is removed 720 from MV, and it is again determined 712 whether the cardinality of MV is equal to zero. If vertex base reconstruction is to be performed, the parity strip represented by face f in F minus MF (F−MF) is determined 722, such that there is only one missing incident vertex v belonging to MV, in the set of vertices that f is incident to. The data strip represented by v is reconstructed 724 by XORing the parity strip represented by f and the data strips represented by other vertices not belonging to MV, that f is incident to. The data strip represented by v is removed 726 from MV, and it is again determined 712 whether the cardinality of MV is equal to zero. If YES, the data strips represented by v1,v2,v3,v4 read from constituent storage media in ascending order of the data strip distribution are concatenated 728 to form the requested data stripe DS. It is then determined 730 whether parity reconstruction is to be done. If NO, then the requested data in data stripe DS is transferred 740 to the data requestor, and if YES, then parity reconstruction is performed. For parity reconstruction, it is determined 732 whether the cardinality of MF is equal to zero, which may advise how many missing faces are to be reconstructed. If YES, then the requested data in data stripe DS is transferred 740 to the data requestor. If NO, the next missing parity strip represented by missing face f belonging to MF is determined 734. The parity strip represented by f is reconstructed 736 by XORing three data strips represented by vertices belonging to V on which f is incident. The parity strip represented by f is removed 738 from MF.

Reconstruction may be iterative and for a given reconstruction iteration of a missing vertex, there may be multiple options using different sets of faces and vertices for reconstruction. Presence (not missing) of the corresponding faces and vertices of a given combination may be a constraint to choose the combination for reconstruction. Operationally, if the inputs of a combination are present, XORing may take the same time irrespective of the combination. If there are more than one missing entities in a face/vertex combination, the data may not be recoverable because XORing a partial set of data does not produce the original data. For each reconstruction iteration within the fault tolerance limit, there exists at least one combination where all the set of inputs (vertices and or faces) are present and only the data to be reconstructed is missing. For combinations of missing drives up to fault tolerance limits, there is at least one combination to recover missing data.

An example of vertex based reconstruction for a given data stripe DS on a cube volume C, if data strips Data3, Data4, and Data5 are missing (see FIGS. 4A-4F), may be performed as follows:

1. V = (Data1, Data2, Data3, Data4, Data5, Data6, Data7, Data8)
   F = (Parity1, Parity2, Parity3, Parity4, Parity5, Parity6)
   MV = (Data3, Data4, Data5),
   MF = ( )
2. Next missing data strip = Data3. Parity strip with only one missing data f = Parity2
3. Data3 = Parity2 XOR Data2 XOR Data6 XOR Data7
4. MV = (Data4, Data5)
5. Next missing data strip = Data4. Parity strip with only one missing data f = Parity1
6. Data4 = Parity1 XOR Data1 XOR Data2 XOR Data3
7. MV = (Data5)
8. Next missing data strip = Data5. Parity strip with only one missing data f = Parity4
9. Data5 = Parity4 XOR Data6 XOR Data2 XOR Data1
10. MV = ( ). All data strips have been reconstructed.

Figure 8B:
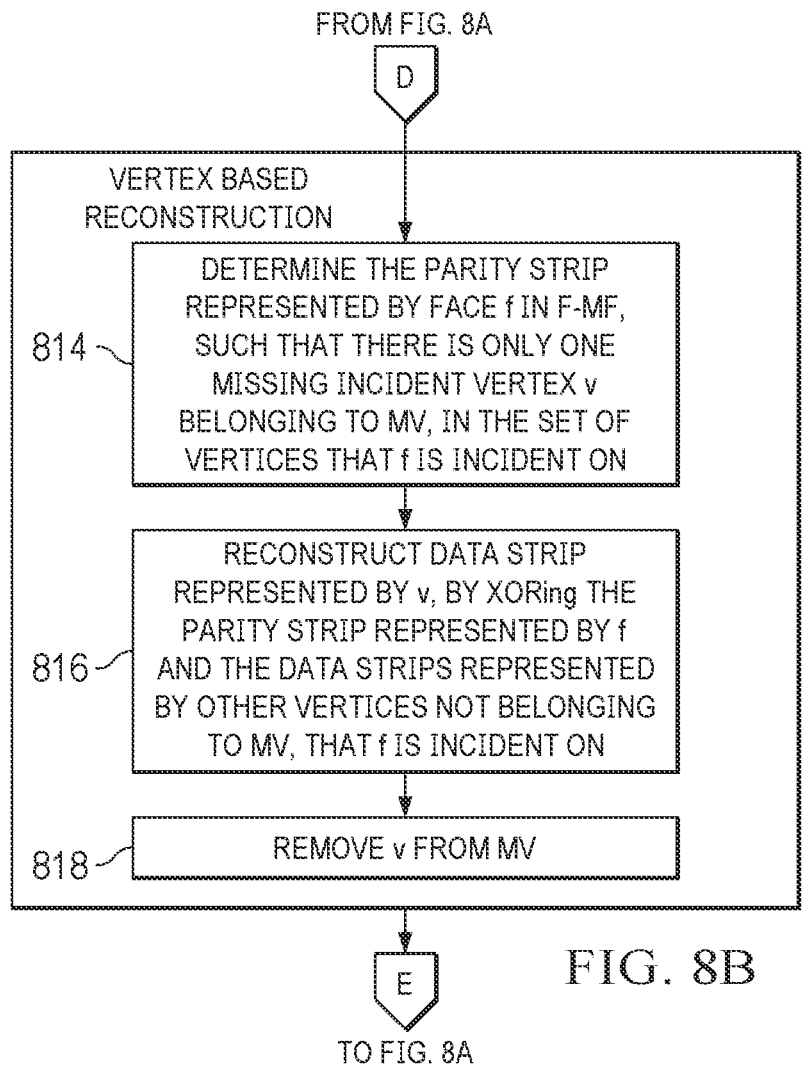
Figure 8C:
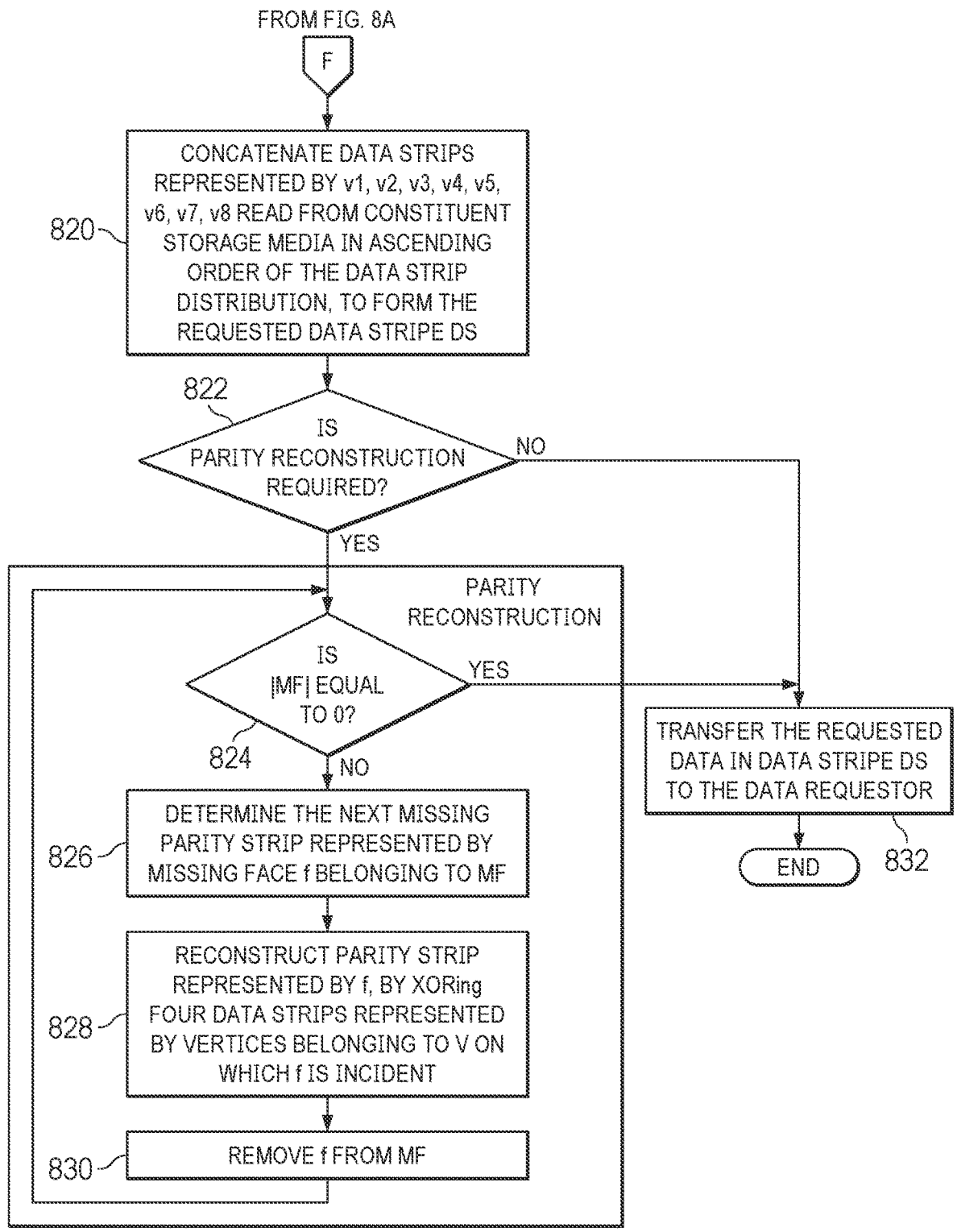
Figure 9A:
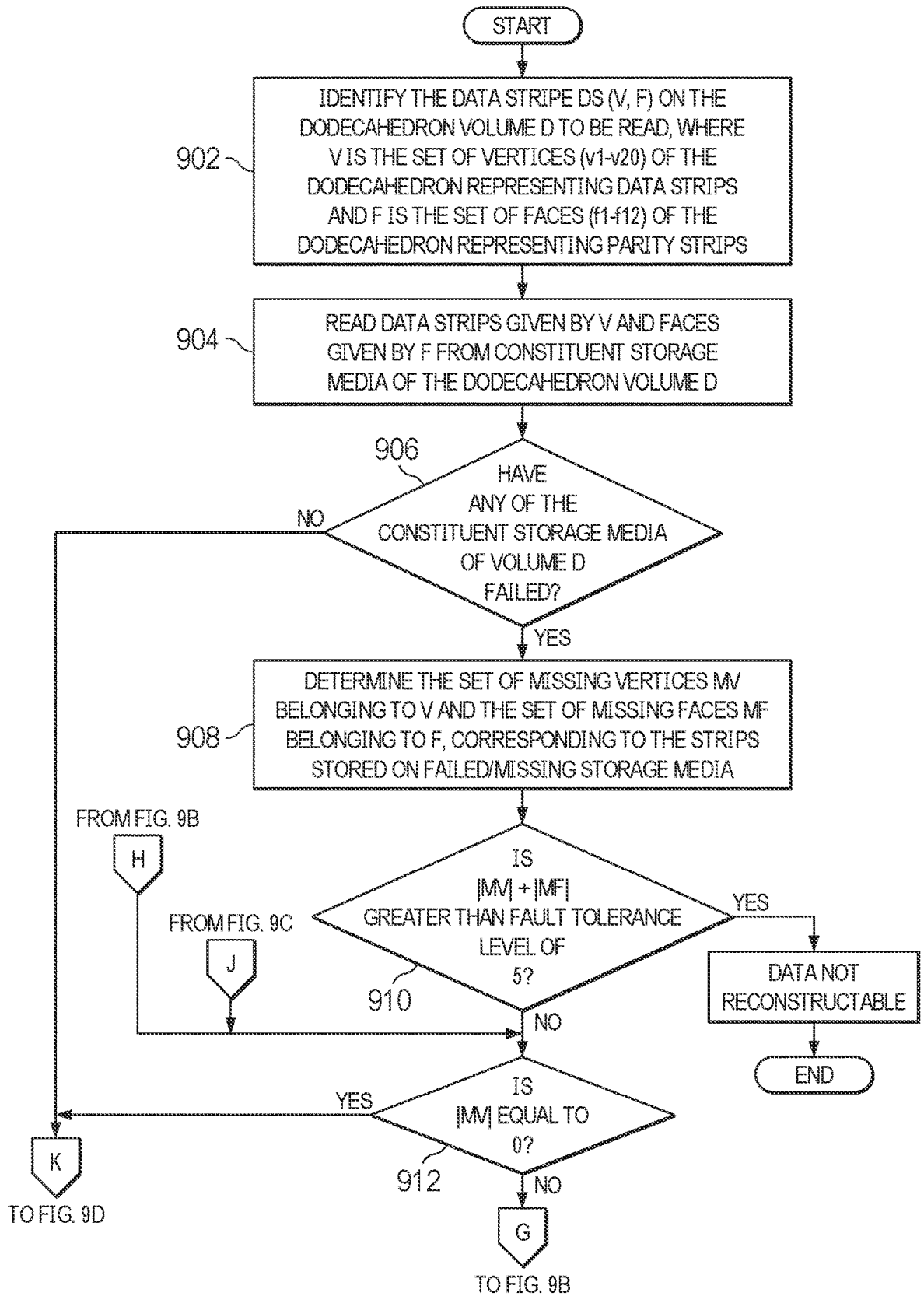
FIGS. 9A through 9D show a flowchart diagram for a reconstruction/read workflow for a dodecahedron, whereby data strips are reconstructed for reads, and whereby data and parity strips are reconstructed for rebuild.
Figure 9B:
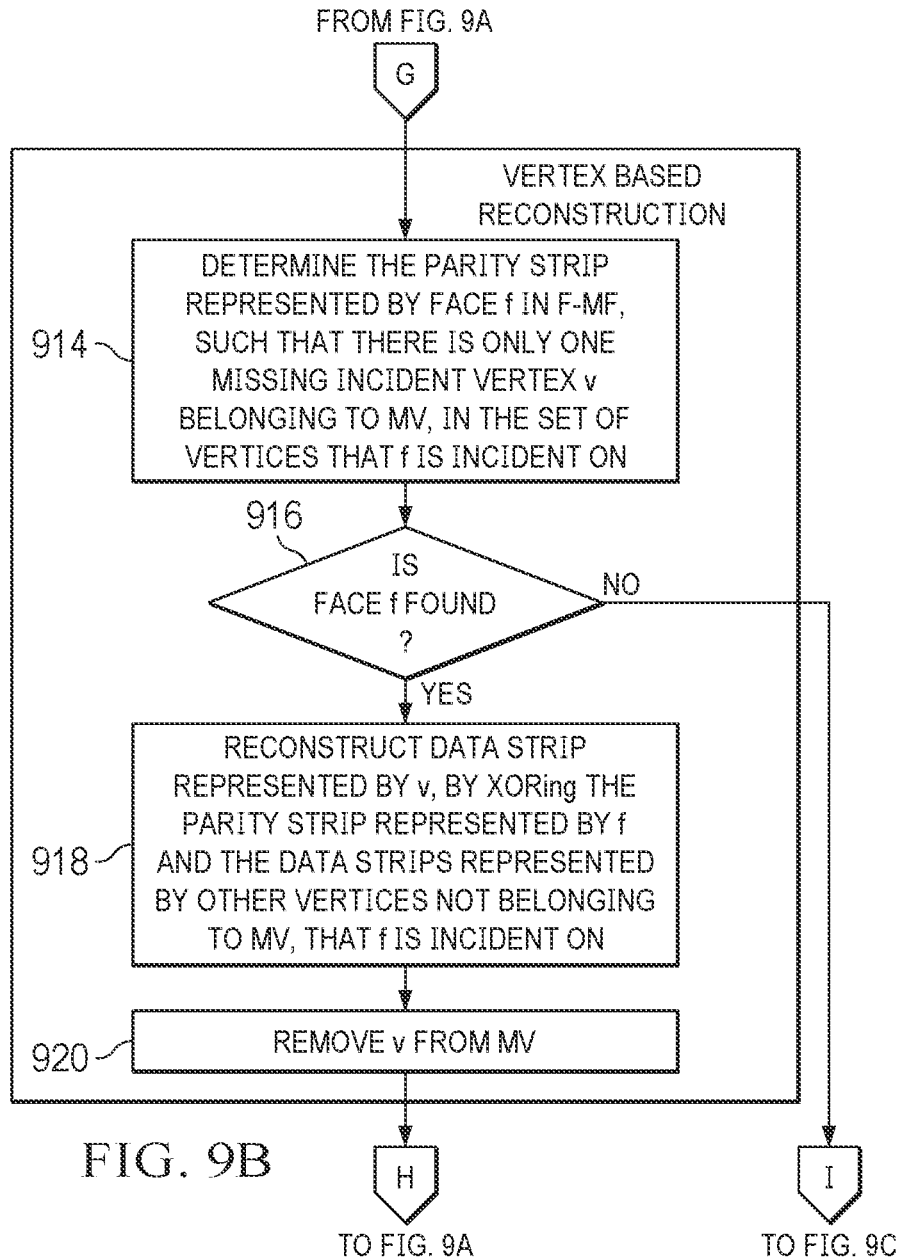
Figure 9C:
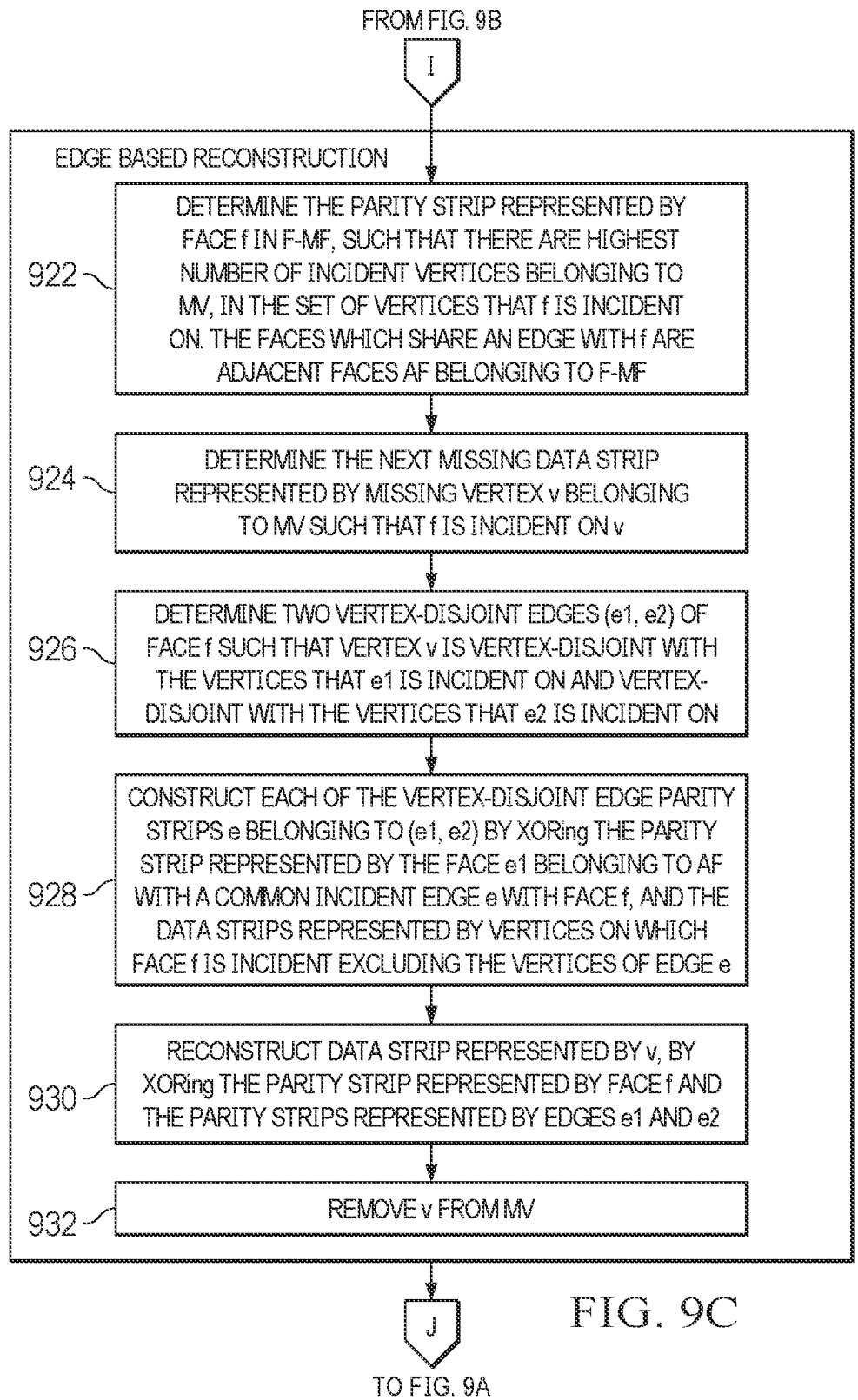
Figure 9D:
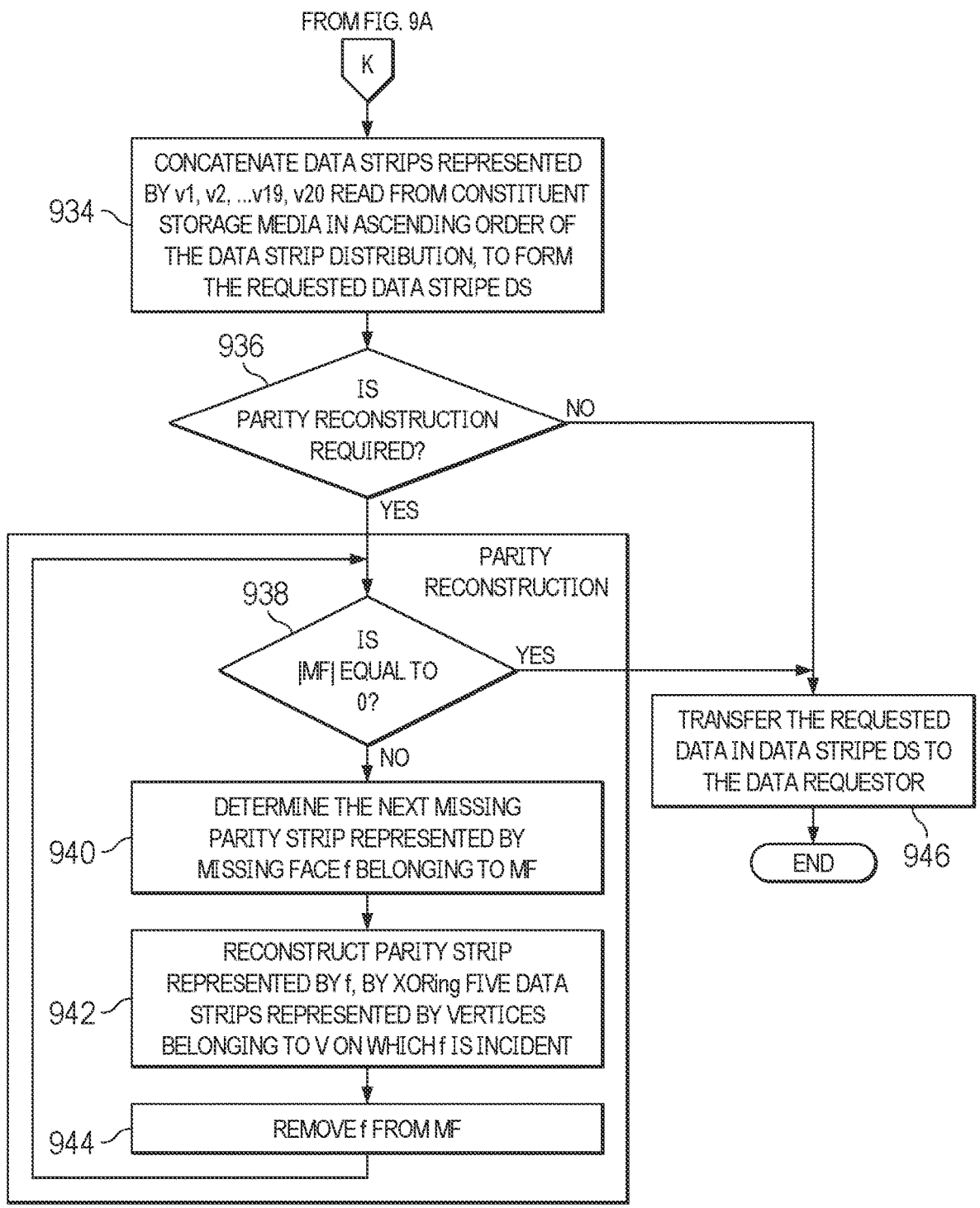

FIGS. 8A through 8C show a flowchart diagram for a reconstruction/read workflow for a cube, whereby data strips are reconstructed for reads, and whereby data and parity strips are reconstructed for rebuild. The data stripe DS (V,F) on the Cube volume C to be read is identified 802, where V is the set of vertices (v1,v2,v3,v4,v5,v6,v7,v8) of the cube representing data strips and F is the set of faces (f1,f2,f3, f4,f5,f6) of the cube representing parity strips. Data strips given by V and faces given by F are read 804 from constituent storage media of the Cube volume C. It is then determined 806 whether any of the constituent storage media of volume T have failed. If NO, meaning no constituent storage media have failed, then the data strips represented by v1,v2,v3,v4,v5,v6,v7,v8 read from constituent storage media in ascending order of the data strip distribution are concatenated 820 to form the requested data stripe DS, and if YES, the set of missing vertices MV belonging to V and the set of missing faces MF belonging to F are determined 808, corresponding to the strips stored on failed/missing storage media. It is then determined 810 whether the cardinality of MV plus the cardinality of MF is greater than a fault tolerance level of three (3). If YES, then the data is not reconstructable and the process ends. If NO, then it is determined 812 whether the cardinality of MV is equal to zero. If YES, meaning the cardinality of MV is equal to zero, then data strips represented by v1,v2,v3,v4, v5,v6,v7,v8 read from constituent storage media in ascending order of the data strip distribution are concatenated 820 to form the requested data stripe DS, and if NO, vertex based reconstruction is performed. To reconstruct the missing vertexes, the parity strip represented by face f in F minus MF is determined 814, such that there is only one missing incident vertex v belonging to MV, in the set of vertices that f is incident to. When there are sets of missing vertices or missing faces that need reconstruction, there may be more than one combination to reconstruct the data because there may be embedded redundancy of a given vertex in three faces. In the polyhedron code, there will be at least one combination where a face and its corresponding vertices are present. The parity strip represented by face f in F minus MF is determined 814 by filtering the incomplete combinations by adhering to rules: (1) the vertex v to be reconstruction is incident on a face f that is present; and (2) the other vertices incident on the face f are present. The data strip represented by v is reconstructed 816 by XORing the parity strip represented by f and the data strips represented by other vertices not belonging to MV, that f is incident to. The data strip represented by v is removed 818 from MV, and it is again determined 712 whether the cardinality of MV is equal to zero. If YES, the data strips represented by v1,v2,v3,v4, v5,v6,v7,v8 read from constituent storage media in ascending order of the data strip distribution are concatenated 820 to form the requested data stripe DS. It is then determined 822 whether parity reconstruction is to be done depending on whether data is missing. If NO, then the requested data in data stripe DS is transferred 832 to the data requestor, and if YES, then parity reconstruction is performed. For parity reconstruction, it is determined 824 whether the cardinality of MF is equal to zero, wherein MF indicates a set of missing faces and where the cardinality of MF is equal to zero there is no missing parity to reconstruct. If YES, then the requested data in data stripe DS is transferred 832 to the data requestor. If NO, the next missing parity strip represented by missing face f belonging to MF is determined 826. The parity strip represented by f is reconstructed 828 by XORing four data strips represented by vertices belonging to V on which f is incident. The parity strip represented by f is removed 830 from MF.

An example of edge based reconstruction for a given data stripe DS on a dodecahedron volume D, if data strips Data1, Data2, Data3, Data4, Data5, and Data6 are missing (see FIGS. 5A-5F), may be performed as follows:

1. V = (Data1, Data2, . . . , Data 19, Data20)
   F = (Parity1, Parity2, . . . , Parity11, Parity12)
   MV = (Data 1, Data 2, Data 3, Data 4, Data 5, Data6)
   MF = ( )
2. Next missing data strip = Data6. Parity strip with only one missing data f = Parity7
3. Data6 = Parity7 XOR Data7 XOR Data16 XOR Data20 XOR Data 15
4. MV = (Data 1, Data2, Data3, Data4, Data5)
5. No parity strip with only one missing data. Switching to edge-based reconstruction,
6. Face with highest missing vertices, f = Parity 1.
   Vertices incident to f = (Data1, Data2, Data3, Data4, Data5)
   Edges incident to f = ((Data1, Data2), (Data2, Data3), (Data3, Data4), (Data4, Data5), (Data5, Data1))
   Adjacent faces to f = (Parity2, Parity3, Parity4, Parity5, Parity6)

-continued

7. Next missing data strip v = Data1
8. Vertex disjoint edges with v = ((Data2, Data3), (Data4, Data5))
9. Edge1 = (Data2, Data3)
10. Adjacent face to f, incident to edge1 = Parity 3
11. Edge1 Calculation = Parity3 XOR Data8 XOR Data9 XOR Data10
12. Edge2 = (Data4, Data5)
13. Adjacent face to f, incident to edge2 = Parity 5
14. Edge2 Calculation = Parity5 XOR Data12 XOR Data13 XOR Data14
15. Data1 = Parity1 XOR Edge1 Calculation XOR Edge2 Calculation
16. MV = (Data2, Data3, Data4, Data5)
17. Next missing data strip = Data2. Parity strip with only one missing data f = Parity2. Vertex based reconstruction possible.
18. Data2 = Parity2 XOR Data1 XOR Data6 XOR Data7 XOR Data8
19. MV = (Data3, Data4, Data5)
20. Next missing data strip = Data3. Parity strip with only one missing data f = Parity3
21. Data3 = Parity3 XOR Data2 XOR Data8 XOR Data9 XOR Data10
22. MV = (Data4, Data5)
23. Next missing data strip = Data4. Parity strip with only one missing data f = Parity4
24. Data4 = Parity4 XOR Data3 XOR Data10 XOR Data11 XOR Data12
25. MV = (Data5)
26. Next missing data strip = Data5. Parity strip with only one missing data f = Parity5
27. Data5 = Parity5 XOR Data4 XOR Data12 XOR Data13 XOR Data14
28. MV = ( ). All data strips have been reconstructed.

A joint edge is an edge of the polyhedron incident to two faces of the polyhedron and incident to two vertices at opposite ends of the edge, wherein the edge is joined at the vertex of interest and the edge is disjoined at the other vertex not of interest. A disjoint edge is an edge of the polyhedron incident to two faces of the polyhedron, wherein one of the faces is the same as one of the faces incident to the joint edge and the other face is an adjacent face, wherein one of its two vertices is the disjoined vertex not of interest.

FIGS. 9A through 9D show a flowchart diagram for a reconstruction/read workflow for a dodecahedron, whereby data strips are reconstructed for reads, and whereby data and parity strips are reconstructed for rebuild. The data stripe DS (V,F) on the Dodecahedron volume D to be read is identified 902, where V is the set of vertices (v1-v20) of the Dodecahedron representing data strips and F is the set of faces (f1-f12) of the Dodecahedron representing parity strips. Data strips given by V and faces given by F are read 904 from constituent storage media of the Dodecahedron volume D. It is then determined 906 whether any of the constituent storage media of volume D have failed. If NO, meaning no constituent storage media have failed, then the data strips represented by v1,v2, . . . ,v19,v20 read from constituent storage media in ascending order of the data strip distribution are concatenated 934 to form the requested data stripe DS, and if YES, the set of missing vertices MV belonging to V and the set of missing faces MF belonging to F are determined 908, corresponding to the strips stored on failed/missing storage media. It is then determined 910 whether the cardinality of MV plus the cardinality of MF is greater than a fault tolerance level of five (5). If YES, then the data is not reconstructable and the process ends. If NO, then it is determined 912 whether the cardinality of MV is equal to zero. If NO, then vertex base reconstruction is performed, and if YES, meaning the cardinality of MV is equal to zero, then data strips represented by v1,v2, . . . v19,v20 read from constituent storage media in ascending order of the data strip distribution are concatenated 934 to form the requested data stripe DS, and if NO, the vertex base is reconstructed. The parity strip represented by face f in F minus MF is determined 914, such that there is only one missing incident vertex v belonging to MV in the set of vertices that f is incident to. When there are sets of missing vertices or missing faces that need reconstruction, there may be more than one combination to reconstruct the data because there may be embedded redundancy of a given vertex in three faces. In the polyhedron code, there will be at least one combination where a face and its corresponding vertices are present. The parity strip represented by face f in F minus MF is determined 814 by filtering the incomplete combinations by adhering to rules: (1) the vertex v to be reconstruction is incident on a face f that is present; and (2) the other vertices incident on the face f are present. Next, it is determined 916 whether face f is found. If NO, then proceed to edge based reconstruction, and if YES, meaning the face f is found, the data strip represented by v is reconstructed 918 by XORing the party strip represented by f and the data strips represented by other vertices not belonging to MV that f is incident to. The data strip represented by v is removed 920 from MV. It is again determined 912 whether the cardinality of MV is equal to zero. For edge based reconstruction, the parity strip represented by face f in F minus MF (F−MF) is determined 922 such that there are the highest number of incident vertices belonging to MV in that set of vertices that f is incident to. The faces which share an edge with f are adjacent faces AF belonging to F minus MF. The next missing data strip represented by missing vertex v belonging to MV such that f is incident to v is determined 924. Two (2) vertex-disjoint edges (e1, e2) of face f are determined 926 such that vertex v is vertex-disjoint with the vertices that e1 is incident to and vertex-disjoint with the vertices that e2 is incident to. Each of the vertex-disjoint edge parity strips e belonging to (e1, e2) is constructed 928 by XORing the parity strip represented by the face ef belonging to AF with a common incident edge e with face f, and the data strips represented by vertices on which face ef is incident excluding the vertices of edge e. The data strip represented by v is reconstructed 930 by XORing the parity strip represented by face f and the parity strips represented by edges e1 and e2. The reconstructed data strip represented by v is removed 932 from MV. After data strips represented by v1,v2, . . . v19,v20 read from constituent storage media in ascending order of the data strip distribution are concatenated 934 to form the requested data stripe DS, it is determined 936 whether parity reconstruction should be performed. If NO, then the requested data in data stripe DS is transferred 946 to the data requestor, and if YES, then parity reconstruction is performed. For parity reconstruction, it is determined 938 whether the cardinality of MF is equal to zero. If YES, then the requested data in data stripe DS is transferred 946 to the data requestor. If NO, the next missing parity strip represented by missing face f belonging to MF is determined 940. The parity strip represented by f is reconstructed 942 by XORing five data strips represented by vertices belonging to V on which f is incident. The parity strip represented by f is removed 944 from MF.

FIG. 10 shows characteristics for various parameters: RAID 5, RAID 6, tetrahedron, Cube and Dodecahedron volumes. The probability of failure has an annualized failure rate (AFR) of a disk equal to 1.37. The AFR is a relation between the mean time between failure (MTBF) and the hours that a number of devices are run per year. The probability of failure row in FIG. 10 indicates a value range, which indicates the probability of failure of the volume. The value range depends on the number of disks, between a least number supported and up to thirty-two disks. The value range is from 2.74-21.92 for a RAID 6 based on the number of disks ranging from four to thirty-two drives. The value range is from 4.11-43.84 for a RAID 5 based on the number of disks ranging from three to thirty-two drives. The number of Galois field multiplications per data stripe is a polynomial time complexity varying based on number of data disks.

According to an example, characteristics of Tetrahedron (8, 4, 3) include: eight disks; a failure tolerance of up to four storage units; a storage overhead equal to two times; a probability of failure equals 3.65 with an AFR of a disk equal to 1.37; a write computational overhead equals eight XORs; a read computational overhead of zero for an optimal volume with (0) degradation, a low degradation (1) of two XORs, a medium degradation (2) of four XORs, and a high degradation (3) of six XORs; a rebuild computation overhead has a low degradation (1) of two XORs plus a strip write, a medium degradation (2) of four XORs plus two strip write, and a high degradation (3) of six XORs plus three strip write; and a number of Galois Field multiplications is zero.

Figure 11:
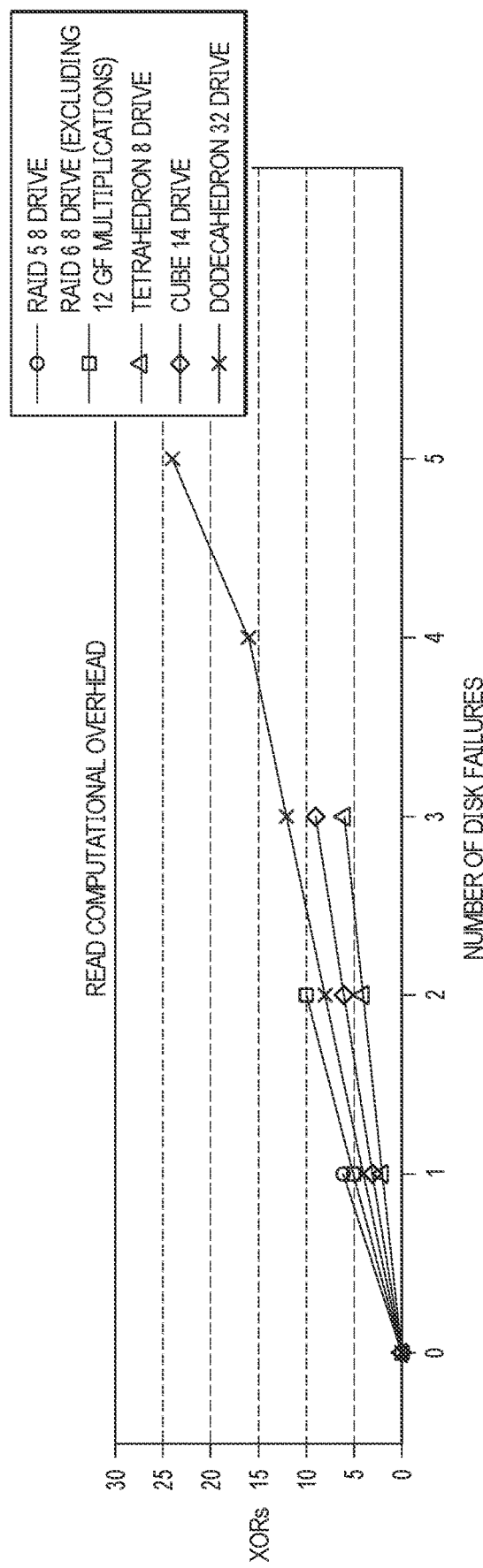
FIG. 11 shows a chart of the read computational overhead in XORs, wherein the number of XORs are plotted against the number of disk failures.

FIG. 11 shows a chart of the read computational overhead in XORs. The number of XORs are plotted against the number of disk failures.

FIG. 12 shows performance estimates (X times single drive) of different fault tolerant volumes for various different I/O types run on different types of storage disks Graph-based erasure coding modeled on a polyhedron using a computational operation such as bitwise XOR (Binary exclusive OR) for encoding and decoding data operations may be used to provide failure resilience to: storage controller, storage accelerator, software RAID, software erasure code, and distributed storage networks. Graphs are a broader category with polyhedron being a subset of a three-dimensional solid. A polyhedron may be a regular polyhedron, such as tetrahedron, cube, and dodecahedron. A polyhedron may be an irregular polyhedron, such as a square-based pyramid and a rectangular-based pyramid. Polyhedrons may be used for establishing relationships between subsets of data may also find use in encryption owing to its symmetric nature.

Storage media may include: disk packs, paper storage, hard disk, solid-state drive, non-volatile memory modules, pen drive, blu-ray disk, SD card, CD drive, DVD drive, memory card, floppy disk, disk packs, paper storage, optical drive, zip drive, and magnetic tapes. A hard disk is a round disk called a spindle, which has a half-inch spindle made of aluminum and non-magnetic material and is mounted on a circular stack of magnetic material of 10-20 nm diameters. A solid-state drive is used to store and retrieve information in the computer, and it is just like a hard disk drive, except it does not have any moving parts. Pen drives are portable hard drives called USB flash drives, thumb drives, and jump drives. Blu-ray disk is an optical media storage for high-definition (HD) videos and other high-quality audio. A secured digital card (SD card) includes numerous chips that store data and information permanently and is a portable storage device mostly used in mobile phones and digital cameras. A compact disk (CD) is a portable secondary storage device that is round and made of polycarbonate plastic. A digital video disk (DVD) is an optical media that stores optical data, and has a shape like a CD, but its storage capacity is more than CD because of its storage capacity. A floppy disk is also called diskette and is made up of a plastic disk plate that is a flexible outer iron oxide layer. It has a cover of plastic called a jacket. In the middle of the jacket, there is a point from where it rotates.

FIG. 13 shows heterogenous nesting. There are twenty-two storage media. At a primary encoding level, eight drives (1-8) are included in a tetrahedron primary volume first leg and fourteen drives (9-22) are included in a cube primary volume second leg. At a secondary encoding level, twenty-two drives are heterogeneously nested in a polyhedron plus RAID 0 volume.

FIG. 14 shows homogeneous nesting. There are twenty-four storage media. At a primary encoding level, eight drives (1-8) are included in a tetrahedron primary volume first leg, eight drives (9-16) are included in a tetrahedron primary volume second leg, and eight drives (17-24) are included in a tetrahedron primary volume third leg. At a secondary encoding level, twenty-four drives are homogeneously nested in a tetrahedron plus 0 volume.

FIG. 15 shows nesting with polyhedron as the secondary encoding level and RAID1 as the primary encoding level. There are sixteen storage media. At a primary encoding level, two drives (1-2) are included in a RAID 1 primary volume, two drives (3-4) are included in a RAID 1 primary volume, two drives (5-6) are included in a RAID 1 primary volume, two drives (7-8) are included in a RAID 1 primary volume, two drives (9-10) are included in a RAID 1 primary volume, two drives (11-12) are included in a RAID 1 primary volume, two drives (13-14) are included in a RAID 1 primary volume, and two drives (15-16) are included in a RAID 1 primary volume. At a secondary encoding level, the sixteen drives are heterogeneously nested in a RAID plus tetrahedron volume.

Although examples have been described above, other variations and examples may be made from this disclosure without departing from the spirit and scope of these disclosed examples.

The invention claimed is:
1. A RAID data storage method comprising:
  redundantly distributing data and parities via erasure coding among different RAID data storage media;
  configuring the data to be reparable when a plurality of RAID data storage media fail;
  splitting a data stripe into a number of data strips, wherein the number of data strips equals the number of vertices of a polyhedron and respective ones of the data strips corresponds to a respective vertex of the polyhedron;
  constructing a number of parities, wherein the number of parities equals the number of faces of the polyhedron and respective ones of the number of parities corresponds to a face of the polyhedron, wherein respective ones of the number of parities are constructed by a computational operation on the data strips corresponding to vertices incident to the face of the polyhedron corresponding to the respective parity; and distributing subsets of data strips and subsets of parities to subsets of RAID storage media, wherein are provided graph-based erasure code models based on polyhedrons using computational operations for encoding and decoding data, and redundantly distributing data and parities among different data storage media.

2. The method of claim 1, wherein the polyhedron is a tetrahedron, cube, or dodecahedron.

3. The method of claim 1, wherein the computational operation is XOR.

4. The method of claim 1, wherein the computational operation is arithmetic, comparison, or logical.

5. The method of claim 1, wherein distributing subsets of data strips and subsets of parities to subsets of RAID storage media comprises distributing according to a rotating distribution pattern.

6. The method of claim 1, comprising vertex reconstructing a data strip corresponding to a vertex of the polyhedron by XORing a parity corresponding to a face incident to the vertex and data strips corresponding to the remaining vertices respectively incident to the face of the polyhedron corresponding to the parity.

7. The method of claim 1, comprising face reconstructing a data strip corresponding to a vertex of the polyhedron by XORing the parities corresponding to faces incident to the vertex.

8. The method of claim 1, comprising edge reconstructing a data strip corresponding to a vertex of the polyhedron, wherein the vertex is incident to a first joint edge of the polyhedron incident to a proximate face of the polyhedron and the first joint edge is incident to a first disjoined vertex opposite the vertex, wherein the vertex is incident to a second joint edge of the polyhedron incident to the proximate face of the polyhedron and the second joint edge is incident to a second disjoined vertex opposite the vertex, wherein edge reconstruction is by:

determining a first disjoint edge calculation by XORing a parity corresponding to a first adjacent face and data strips corresponding to vertices incident to the first adjacent face other than the vertices incident to a first disjoint edge, wherein the first disjoint edge is an edge of the polyhedron incident to the proximate face and the first adjacent face and one of its two vertices is the first disjoined vertex;

determining a second disjoint edge calculation by XORing a parity corresponding to a second adjacent face and data strips corresponding to vertices incident to the second adjacent face other than the vertices incident to a second disjoint edge, wherein the second disjoint edge is an edge of the polyhedron incident to the proximate face and the second adjacent face and one of its two vertices is the second disjoined vertex; and determining the data strip corresponding to the vertex by XORing a parity corresponding to the proximate face, the first disjoint edge calculation, and the second disjoint edge calculation.

9. The method of claim 1, comprising nesting polyhedron volumes with RAID or erasure coded volumes at different levels.

10. A RAID data storage device comprising:
a plurality of RAID storage media;
an erasure coding controller comprising;
    a processor;
    a memory storing computer-readable instructions that, when executed by the processor, cause the processor to:
        redundantly distribute data and parities via erasure coding among different RAID data storage media;
        configure the data to be reparable when a plurality of RAID data storage media fail;
        split a data stripe into a number of data strips, wherein the number of data strips equals the number of vertices of a polyhedron and respective ones of data strips correspond to respective ones of vertices of the polyhedron;
        construct a number of parities, wherein the number of parities equals the number of faces of the polyhedron and respective ones of the number of parities correspond to respective ones of the number of faces of the polyhedron, wherein respective ones of parities are constructed by a computational operation on the data strips corresponding to vertices incident to a face of the polyhedron corresponding to respective ones of parities; and
        distribute subsets of data strips and subsets of parities to subsets of RAID storage media.

11. The device of claim 10, wherein the polyhedron is a tetrahedron, cube, or dodecahedron.

12. The device of claim 10, wherein the computational operation is XOR.

13. The device of claim 10, wherein the computational operation is arithmetic, comparison, or logical.

14. The device of claim 10, wherein distributing subsets of data strips and subsets of parities to subsets of RAID storage media comprises distributing according to a rotating distribution pattern.

15. The device of claim 10, wherein the plurality of RAID storage media comprises a media selected from hard disk, solid-state drive, pen drive, blu-ray disc, SD card, CD drive, DVD drive, random access memory, memory card, non-volatile memory module, floppy disk, disk packs, paper storage, optical drive and magnetic tapes.

16. The device of claim 10, the memory stores computer-readable instructions that, when executed by the processor, cause the processor to: vertex reconstruct a data strip corresponding a vertex of the polyhedron by XORing a parity corresponding to a face incident to the vertex and data strips corresponding to the remaining vertices respectively incident to the face of the polyhedron corresponding to the parity.

17. The device of claim 10, the memory stores computer-readable instructions that, when executed by the processor, cause the processor to: face reconstruct a data strip corresponding to a vertex of the polyhedron by XORing the parities corresponding to faces incident the vertex.

18. The device of claim 10, the memory stores computer-readable instructions that, when executed by the processor, cause the processor to: edge reconstruct a data strip corresponding to a vertex of the polyhedron, wherein the vertex is incident to a first joint edge of the polyhedron incident to a proximate face of the polyhedron and the first joint edge is incident to a first disjoined vertex opposite the vertex, wherein the vertex is incident to a second joint edge of the polyhedron incident to the proximate face of the polyhedron and the second joint edge is incident to a second disjoined vertex opposite the vertex, wherein edge reconstruction is by:

determining a first disjoint edge calculation by XORing a parity corresponding to a first adjacent face and data strips corresponding to vertices incident to the first adjacent face other than the vertices incident to a first disjoint edge, wherein the first disjoint edge is an edge of the polyhedron incident to the proximate face and the first adjacent face and one of its two vertices is the first disjoined vertex;

determining a second disjoint edge calculation by XORing a parity corresponding to a second adjacent face and data strips corresponding to vertices incident to the second adjacent face other than the vertices incident to a second disjoint edge, wherein the second disjoint edge is an edge of the polyhedron incident to the proximate face and the second adjacent face and one of its two vertices is the second disjoined vertex; and determining the data strip corresponding to the vertex by XORing a parity corresponding to the proximate face, the first disjoint edge calculation, and the second disjoint edge calculation.

19. The device of claim 10, comprising nesting polyhedron volumes with RAID or erasure coded volumes at different levels.

20. A RAID data storage system comprising:
a RAID data storage network comprising:
a plurality of RAID storage nodes;
a gateway erasure coding accelerator comprising;
a processor;
a memory storing computer-readable instructions that, when executed by the processor, cause the processor to:
redundantly distribute data and parities via erasure coding among different RAID data storage media;
configure the data to be reparable when a plurality of RAID data storage media fail;
split a data stripe into a number of data strips, wherein the number of data strips equals the number of vertices of a polyhedron and respective ones of the number of data strips correspond to respective ones of the number of vertices of the polyhedron;
constructing a number of parities, wherein the number of parities equals the number of faces of the polyhedron and respective ones of the number of parities correspond to respective ones of the number of faces of the polyhedron, wherein respective ones of the number of parities are constructed by a computational operation on the data strips corresponding to vertices of a face of the polyhedron corresponding to the respective ones of parities; and
distributing subsets of data strips and subsets of parities to subsets of RAID storage nodes of the plurality of RAID storage nodes.

21. The system of claim 20, wherein the polyhedron is a tetrahedron, cube, or dodecahedron, wherein the computational operation is XOR, wherein the computational operation is arithmetic, comparison, or logical, and wherein distributing subsets of data strips and subsets of parities to subsets of RAID storage nodes comprises distributing according to a rotating distribution pattern.

22. The system of claim 20, wherein the plurality of RAID storage nodes comprises a node selected from hard disk, solid-state drive, pen drive, blu-ray disk, SD card, CD drive, DVD drive, memory card, non-volatile memory module, floppy disk, disk packs, paper storage, optical drive and magnetic tapes.

23. The system of claim 20, the memory stores computer-readable instructions that, when executed by the processor, cause the processor to: reconstruct a data strip corresponding a vertex of the polyhedron by a reconstruction process selected from face reconstruction, vertex reconstruction, and edge reconstruction.

* * * * *